United States Patent [19]
Matthews

[11] 3,937,938
[45] Feb. 10, 1976

[54] METHOD AND APPARATUS FOR ASSISTING IN DEBUGGING OF A DIGITAL COMPUTER PROGRAM

[75] Inventor: Gordon H. Matthews, Dallas, Tex.

[73] Assignee: Action Communication Systems, Inc., Dallas, Tex.

[22] Filed: June 19, 1974

[21] Appl. No.: 480,949

[52] U.S. Cl. .................... 235/153 AK; 340/172.5
[51] Int. Cl.² ........................................ G06F 11/00
[58] Field of Search ............... 235/153 AK, 153 R; 340/172.5

[56] References Cited
UNITED STATES PATENTS

| | | | |
|---|---|---|---|
| 3,415,981 | 10/1968 | Smith et al. | 235/153 R |
| 3,518,413 | 6/1970 | Holtey | 235/153 AK |
| 3,533,082 | 10/1970 | Schnabel et al. | 340/172.5 |
| 3,539,996 | 11/1970 | Bee et al. | 340/172.5 |
| 3,659,272 | 4/1972 | Price et al. | 340/172.5 |
| 3,673,573 | 6/1972 | Smith | 340/172.5 |
| 3,688,263 | 8/1972 | Balogh et al. | 235/153 AK |
| 3,736,566 | 5/1973 | Anderson et al. | 340/172.5 |
| 3,771,131 | 11/1973 | Ling | 340/172.5 |
| 3,784,801 | 1/1974 | Caputo et al. | 235/153 AK |
| 3,805,038 | 4/1974 | Buedel et al. | 235/153 AK |
| 3,813,531 | 5/1974 | King et al. | 235/153 AK |

*Primary Examiner*—Charles E. Atkinson
*Attorney, Agent, or Firm*—Richards, Harris and Medlock

[57] ABSTRACT

The specification discloses a technique for assisting in the detection of errors and malfunctions in the operation of a digital computer program. The system includes circuitry for connection to the back plane of a digital computer for receiving representations of the program instructions executed by the computer. A memory normally connected to a first in-first out configuration includes a plurality of series connected stages connected to receive the representations, each of the representations normally being sequentially stored in successive ones of the stages and then transferred to the output of the memory and dumped. Mode selection circuitry is operable to interconnect the system in the sentinel, breakpoint or snapshot modes. In the sentinel mode, in response to a computer malfunction, the circuitry is operable to connect the memory output to the memory input to form a first in-last out memory configuration to store the instruction representations in the memory. In the breakpoint mode, circuitry is operable to terminate operation of the computer and to connect the memory output to the memory input to store the contents of the memory upon the execution of a preselected program instruction. In the snapshot mode, the circuitry is operable to connect the memory output to the memory input to store the contents of the memory upon the execution of preselected program instructions, without terminating operation of the computer. A display is provided to selectively visually display the stored contents of the memory in order to assist in detecting errors and malfunctions in the operation of the computer program.

57 Claims, 29 Drawing Figures

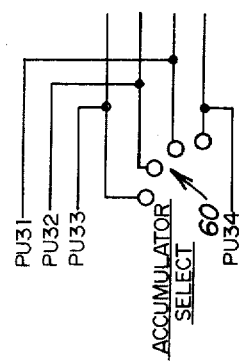
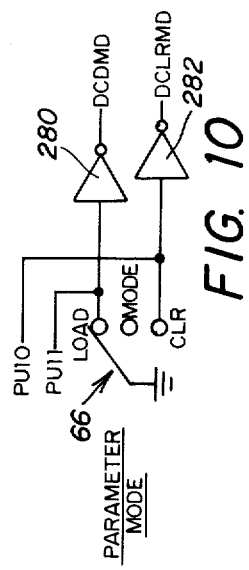
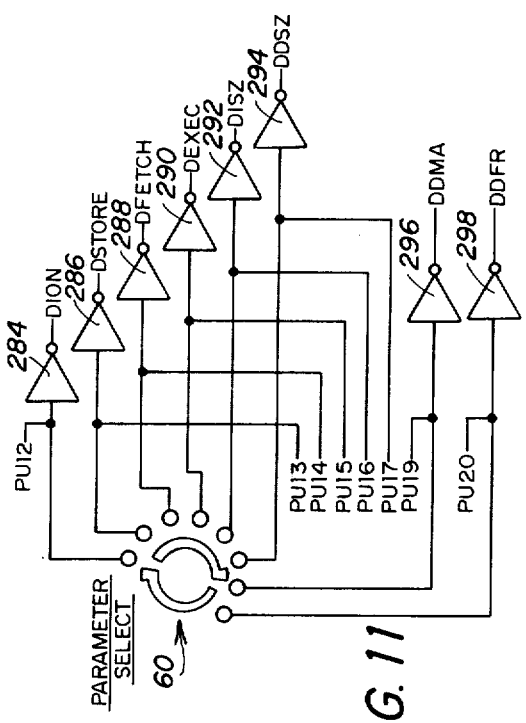
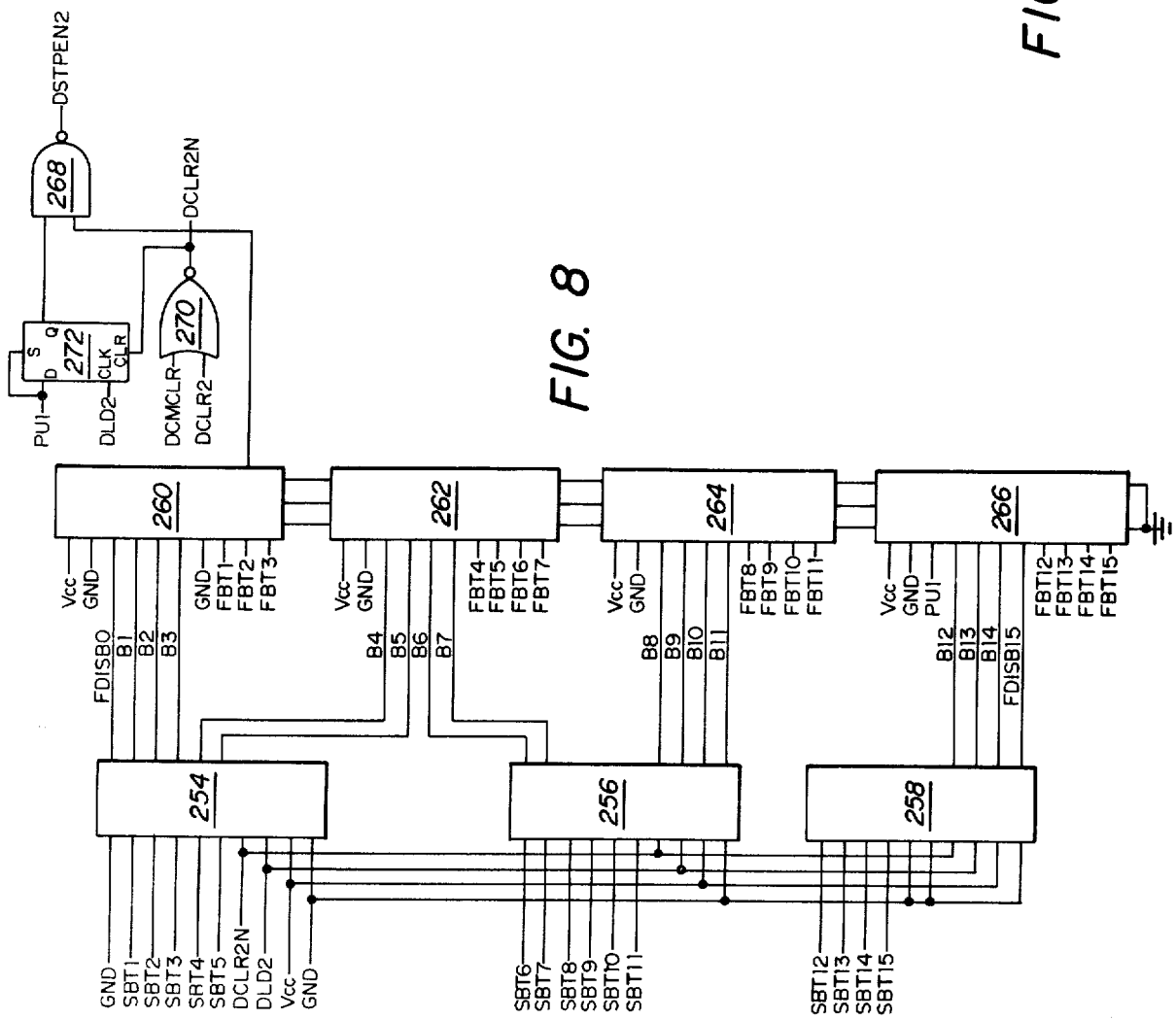
FIG. 9
FIG. 10
FIG. 11
FIG. 8

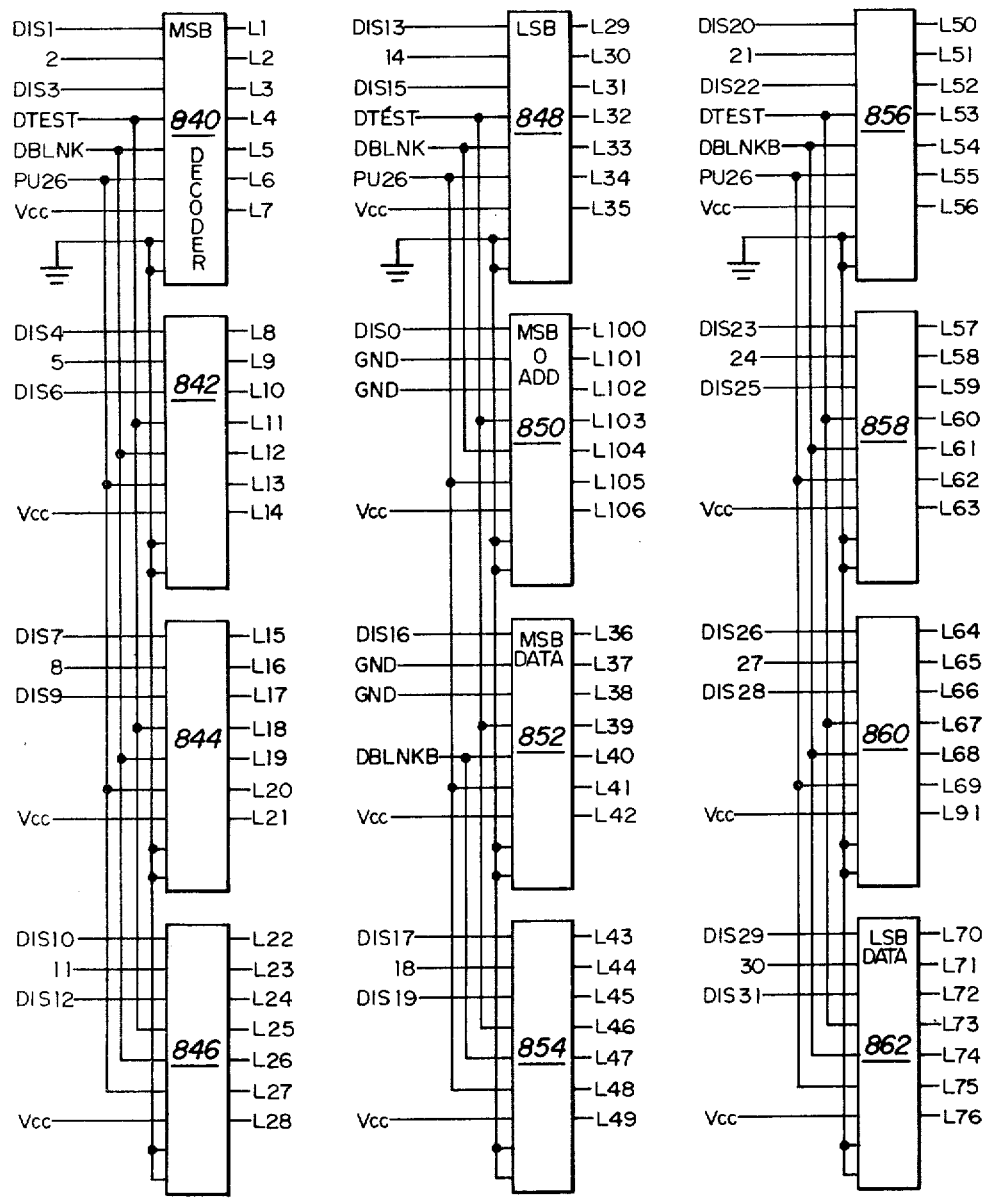
FIG. 22
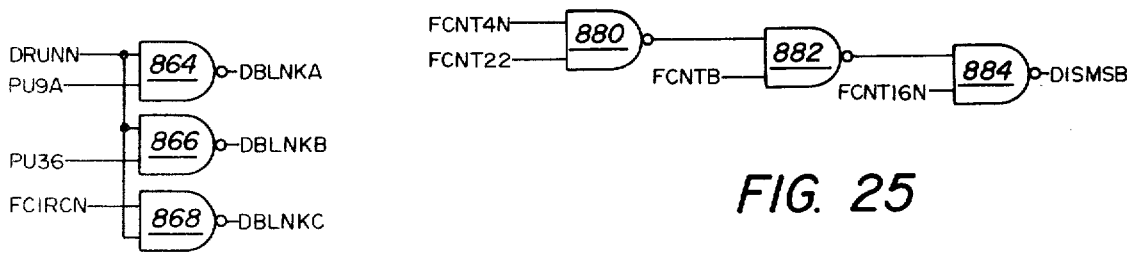
FIG. 23
FIG. 25

METHOD AND APPARATUS FOR ASSISTING IN DEBUGGING OF A DIGITAL COMPUTER PROGRAM

FIELD OF THE INVENTION

This invention relates to data processing techniques, and more particularly relates to a technique for assisting in the detection of errors and malfunctions in the operation of a data processing machine.

THE PRIOR ART

Diagnosis of malfunctions or errors in digital computer programs has long been a problem for the computer industry. Many prior diagnostic or debugging techniques have involved interference with the operation of the data processing machine. Examples of such prior techniques are software test programs in the form of algorithms designed to indirectly pinpoint an errors source and "program checkpointing" wherein at spaced intervals all information necessary to restart a job is read out an auxiliary storage medium. Such prior diagnostic techniques have not been practical due to the computer down time required. Further, with the use of such previously developed debugging systems, when an error has occurred in the operation of the computer, often the entire computer system is shut down and the memory of the point in the program at which the error occurred is lost.

Systems have then thus been developed to maintain a memory of certain portions of the operation of the programs, such as disclosed in U.S. Pat. No. 3,673,573 issued to Richard D. Smith and entitled "Computer with Program Tracing Facility". However, such techniques have required the addition of structure to the interior of the computer, do not give a complete history of the program execution at the specified time and do not provide flexibility of use in different debugging modes. Techniques have also been heretofore developed utilizing hardware additions to a computer in order to provide some memory of operation at predetermined points in the program execution. Examples of such systems may be found in U.S. Pat. No. 3,539,996, issued Nov. 10, 1970 to Mark W. Bee and U.S. Pat. No. 3,771,131, issued Nov. 6, 1973 to Andrew T. Ling.

A need thus exists for a diagnostic device which may be interconnected with a digital computer without requiring modification of the computer circuitry and which may be utilized during operation of the computer without interfering with the operation of the computer. Such a system should enable diagnosis of errors and malfunctions in the computer by allowing a review of any selected portion of the execution of the program. Such a system should have the capability for operation in a variety of debugging modes and should be easily variable to enable the selection of the program addresses and parameters desired to be analyzed.

SUMMARY OF THE INVENTION

In accordance with the present invention, a technique is provided which substantially reduces or eliminates many of the problems heretofore associated with prior techniques for debugging computer programs. In one aspect of the invention, a system is provided for assisting in the detection of errors and malfunctions in the operation of a programmed digital computer which includes a memory connected to the computer for temporarily storing representations of each of the program instructions executed by the computer during operation thereof. Circuitry is responsive to a predetermined state of operation of the computer for controlling the memory to permanently store a predetermined number of the last program instructions executed by the computer prior to the occurrence of the predetermined state of operation.

In accordance with another aspect of the invention, a system is provided for assisting in the detection of errors and malfunctions in the operation of a programmed digital computer which includes circuitry for exterior connection to the computer to receive representations of the program instructions executed by the computer. A memory having a plurality of cells sequentially stores a plurality of the representations of the program instructions. Circuitry is responsive to a predetermined state of operation of the computer for controlling the memory such that a plurality of the last program instructions prior to the occurrence of the predetermined state are stored in the memory cells. A display is operable to selectively display representations of the program instructions stored in the memory cells.

In accordance with another aspect of the invention, a method is provided for monitoring the operation of a digital computer which includes temporarily storing sequences of representations of the program instructions executed by the computer during operation thereof. The method further includes permanently storing a predetermined number of the last program instructions executed by the computer prior to the occurrence of a specified state of operation of the computer.

In accordance with a more specific aspect of the invention, a system is provided for monitoring the operation of a digital computer which includes circuitry for connection to the back plane of the computer for receiving representations of the program instructions executed by the computer. A first in-first out memory includes a plurality of series connected stages connected to receive the representations, each of the representations being sequentially stored in successive ones of the stages and then transferred to the output of the memory. Sentinel circuitry is operable to connect the output to the input of the memory to store the contents of the memory in a first in-last out configuration upon the occurrence of a malfunction of the computer. Breakpoint circuitry is operable to terminate operation of the computer and to connect the output to the input of the memory to store the contents of the memory upon the execution of predetermined program instructions. Snapshot circuitry is operable to connect the output to the input of the computer to store the contents of the memory upon the execution of preselected program instructions, and also to store the contents of the computer accumulator registers. Circuitry is provided to select one of the sentinel, breakpoint or snapshot circuits and for applying selected addresses and parameters to the breakpoint and snapshot circuits. A display is provided for selectively displaying the stored contents of the memory in order to assist in debugging of the digital computer program.

DESCRIPTION OF THE DRAWINGS

For a more complete understanding of the present invention and for further objects and advantages thereof, reference may now be made to the following description taken in conjunction with the accompanying drawings, in which:

FIG. 8 is a schematic diagram of registers for receiving thumb wheel switch settings;

FIG. 9 is a schematic diagram of the accumulator select switch;

FIG. 10 is a schematic diagram of the parameter mode load and clear switch and associated logic circuitry;

FIG. 11 is a schematic diagram of the parameter select switch and associated logic;

FIG. 22 is a schematic diagram of decoding circuitry for operation of the LED display;

FIG. 23 is a schematic circuit of logic for blanking out the LED display;

FIG. 25 is a schematic diagram of logic for enabling the display of the most significant bit of a binary number;

DESCRIPTION OF THE PREFERRED EMBODIMENT

Figure 1:
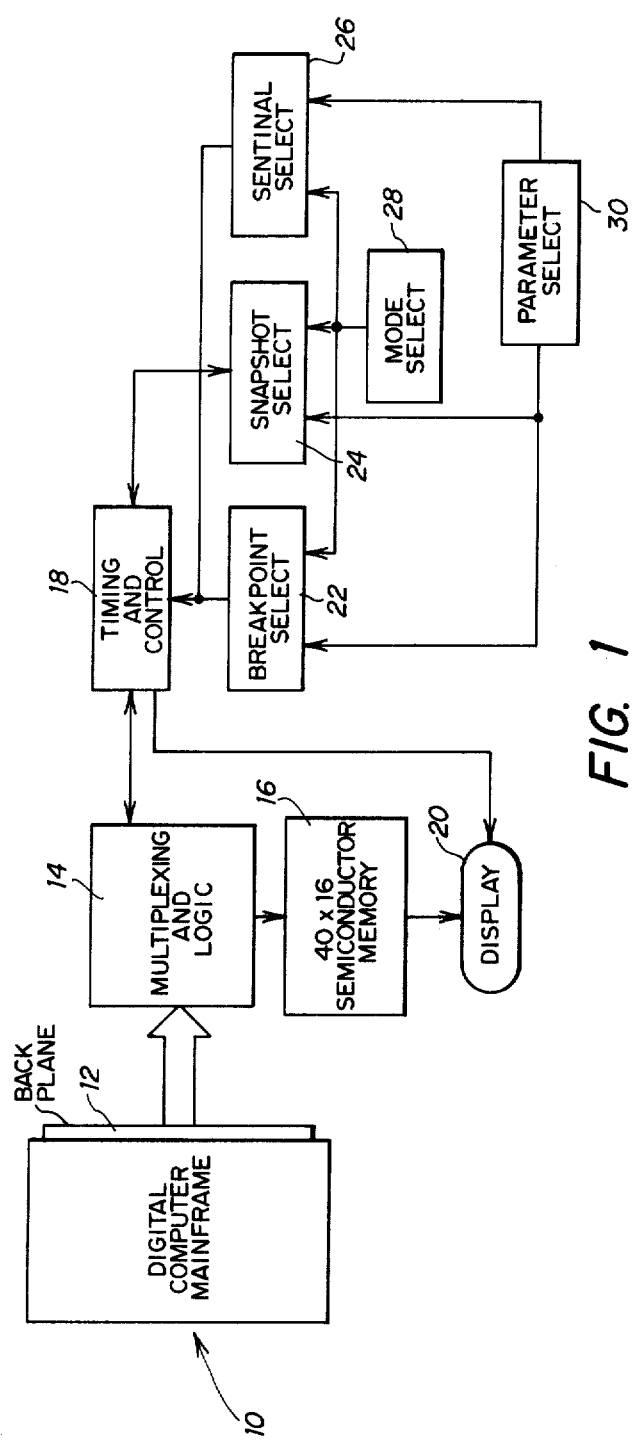
FIG. 1 is a block diagram of the present diagnostic system.

FIG. 1 illustrates a block diagram of the present diagnostic aid circuit. A data processing machine such as a programmed digital computer 10 includes a main frame and a back plane 12 in the conventional manner. While the present system is adapted for operation with any digital computer, the system will be described for use in connection with a 1200 Noval Computer manufactured and sold by the Data General Corporation.

Multiplexing and logic circuitry 14 is connected by connectors extending to the back plane 12 of the computer 10. The multiplexing and logic 14 thus receive representations of each program instruction executed by the computer 10 during operation. These representations are applied to a 40 × 16 semiconductor memory 16 which comprises a sixteen stage storage buffer matrix, each stage having a forty bit capacity. Timing and control circuitry 18 controls the operation of the multiplexing and logic 14 and also comprises a display 20 to enable the contents of the memory 16 to be selectively displayed. A breakpoint select 22, a snapshot select 24 and a sentinel select 26 are controlled by a mode select circuit 28 in order to enable the selection of three possible modes of operation of the present system. A parameter select 30 enables the selection of desired parameters which trigger the operation of the system.

In operation of the present system shown in FIG. 1, the mode select 28 is operated to select one of the breakpoint, snapshot or sentinel selects 22, 24 or 26. Assuming that the sentinel select 26 is selected, the timing and control 18 operates the multiplexing and logic 14 such that representations of each instruction executed by the CPU of the digital computer 10 are applied to the semiconductor memory 16. As noted, the memory 16 comprises sixteen series connected storage buffers normally operable as a first in-first out memory which sequentially stores successive instructions. The instructions are stepped downwardly through the memory 16 and are thus temporarily stored for a prescribed interval. After an instruction has been sequentially stored by each of the sixteen stages of the memory 16, the instruction is then output from the memory 16 and "dumped". The memory 16 then operates as a temporary storage for representations of the last sixteen program instructions executed by the computer 10 during operation.

In the sentinel mode, when the computer 10 stops due to a malfunction, the output of the memory 16 is "wrapped around" to the input of the memory 16 to thereby permanently store the last sixteen instructions executed by the computer before the occurrence of the malfunction. The computer in this mode becomes a first inlast out memory. The operator may then selectively display any of the sixteen instructions stored in the memory 16 upon the display 20. In the preferred embodiment, two six digit words will be displayed for each instruction, the words indicating the instruction and its address. Since the output of the memory 16 is "wrapped around" to the input of the memory, the sixteen stored instructions are not lost when stepped through the memory and thus may be circulated in the memory in either direction and reviewed on the display 20. By a visual review of the stored instructions, the operator is greatly assisted in detecting where and how the error occurred which caused the malfunction of the computer 10.

If the breakpoint mode of operation is selected by operation of the breakpoint select 22, the timing and control 18 operates the multiplexing and logic 14 to continuously apply representations of each program instruction executed by the computer 10 to the memory 16. The program instructions are sequentially stored in the sixteen stages of the first in-first out memory 16 in the manner previously described. The parameter select 30 is operated to input addresses and parameters of predetermined instructions which the operator desires to review. These points, or breakpoints, will generally be known to the operator as possible weak points in the program which the operator will want to study during the operation of the program.

The computer 10 operates normally until the logic 14 detects one of the breakpoint addresses and parameters input at the parameter select 30. At this point, the logic stops operation of the computer 10 and ties the output of the memory 16 to the input of the memory 16 in order to provide a "wrap around" memory to permanently store the last sixteen instructions executed by the computer 10 prior to the occurrence of the breakpoint. The memory 16 in this configuration then becomes a first in-last out memory. The operator may then selectively operate the display 20 in order to initially visually inspect the last in instruction address and instructions stored in the memory 16. The operator may then circulate the stored instructions around the memory and may visually inspect any of the other instructions or addresses stored in the memory. The present system enables three unique breakpoint addresses to be input through the parameter select, with two additional registers in the parameter select used to define the start and stop limits of an address range. The system thus provides the user with the ability to stop the computer at any point during the operation. The operator may pick a stop at a certain address on a load, on a store, when the address is on an increment or decrement memory, or during a fetch operation of the computer.

If the snapshot mode is selected by operation of the snapshot select 24, the system operates in a similar manner as during the breakpoint mode, except that the operation of the computer is not stopped. Prior to operation in the snapshot mode, the address of a designated point in the program is input into the parameter select 30. Upon the execution by the computer of the address stored in the parameter select 30, the last sixteen program instructions prior to the occurrence of the address are stored within the memory 16 in the manner previously described.

In addition, the contents of the computer accumulator registers may be stored in the snapshot mode. A 100 nanosecond stop pulse is applied to stop the computer and to enable the front panel switches on the computer. Enable pulses are also applied to the accumulator zero switch and the contents of the as many as four accumulators are stored in the memory 16. Four hundred nanoseconds after being stopped, a restart pulse is generated by the system and the computer 10 is restarted. Due to the fact that the entire "snapshot" operation occurred during the 400 nanoseconds, the computer 10 continues normal operation and is unaffected by the short stop. The snapshot mode thus enables "snapshots" of the internal operation of the computer to be taken without interrupting the normal operation of the computer.

Figure 2:
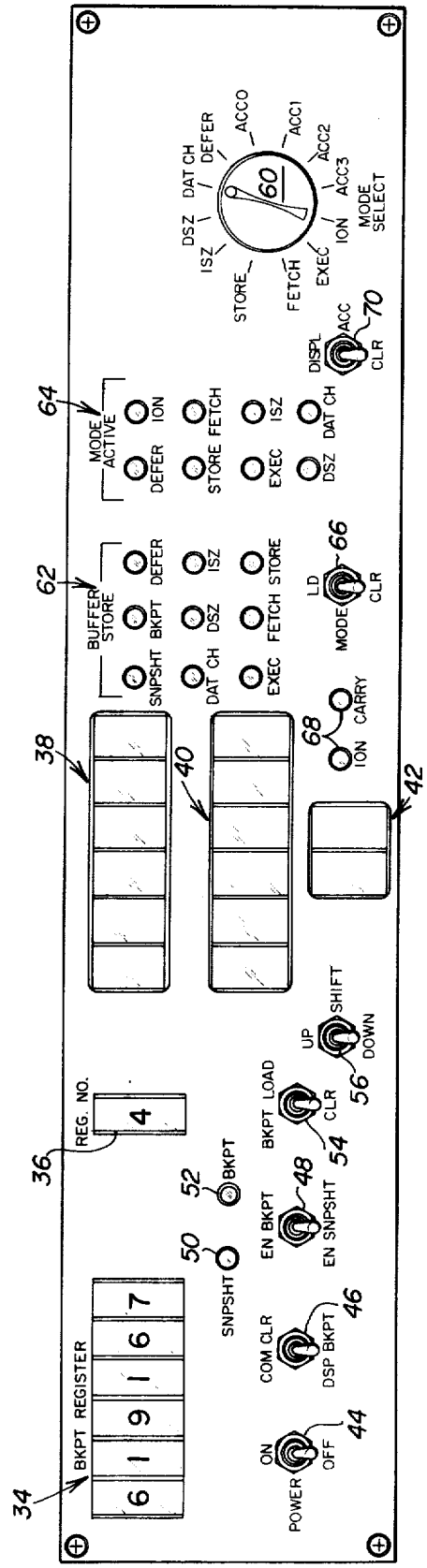
FIG. 2 is a view of the front console panel of the present system.

FIG. 2 illustrates the front panel of the system which includes switches for selecting the sentinel, snapshot or breakpoint mode and for inputting the desired parameters for use during the selected mode. In addition, the front panel includes displays indicating the mode of operation of the system and allowing a visual inspection of the instructions stored by the machine. The present system will normally be packaged within a housing and includes a cable at the rear which attaches to the back plane of the computer being monitored. The present system is thus totally independent of the internal operation of the computer 10 and does not interfere with the operation thereof. The present system may be utilized on any one of a number of different types of computers, with only minor changes in the connection cable for attachment to the back plane of a particular computer.

Referring to FIG. 2, six thumb wheel switches 34 each may be set at any one of ten positions in order to choose addresses for operation in the breakpoint mode. A single thumb wheel switch 36 may be set at any one of six positions. The first three positions of the switch 36 designate the three possible breakpoint addresses which may be input through the thumb wheel switches 34. The fourth and fifth positions of the switch 36 define registers for accumulating an upper and lower breakpoint to define a breakpoint range which may be set through operation of the breakpoint register switches 34. The sixth position of the switch 36 initiates a test mode and all of the light emitting diodes on the console are illuminated in order to enable testing thereof.

An address display 38 comprises six numeric light emitting diodes (LED) which may visually display the addresses of the instructions stored in the memory 16, or the breakpoint addresses currently in the system. A data display 40 comprises six LEDS which may be selectively energized to display any of the instructions stored within the memory 16. A pointer display 42 comprises two LEDS which indicate which of the sixteen stages of the memory 16 are being displayed on the displays 38 and 40.

A two position toggle switch 44 enables the entire system to be turned on or off. A three position on-off-on toggle switch 46 is normally in the middle off position. When the switch is moved to its upper position, comprehensive clear is initiated and all registers in the present system are cleared in order to initialize the device for a new operation. When the toggle switch 46 is depressed, the display breakpoint is initiated and the breakpoint data presently input in the system is displayed in the data display 40 as long as the toggle switch is depressed.

A three position on-off-on toggle switch 48 maintains the system normally in the sentinel mode when the switch 48 is in the central position. When the switch is moved upwardly, the enable breakpoint is energized and the system is placed in the breakpoint mode. When the switch 48 is depressed, the enable snapshot is initiated in order to place the system in the snapshot mode. An LED 50 is energized when the system is in the snapshot mode and an LED 52 is energized when the system is in the breakpoint mode.

A three position toggle switch 54 is normally in the center off position. When the switch 54 is depressed, the particular breakpoint register designated by switch 36 is cleared. When the switch 54 is pushed upwardly, the data entered into the thumb wheel switches 34 is loaded into the particular breakpoint register selected by the thumb wheel switch 36.

A three position toggle switch 56 is normally in the center off position. When the switch is depressed, the pointer display 42 is decremented and the data in the next lower memory cell is displayed on the displays 38 and 40. When the switch 56 is pushed upwardly, the pointer 42 is incremented and the data in the corresponding memory cell is displayed in the memories 38 and 40. By operation of the switch 56, the user may visually inspect information stored in any of the sixteen memory cells of the memory 16. An important aspect of the invention is that when data is permanently stored in the memory, the last in instruction is first displayed, as this instruction will generally be of primary importance to the user.

A parameter select circular switch 60 is utilized to select the parameter desired for the breakpoint or snapshot mode. Switch 60 may be moved to any one of the following positions:

| SWITCH POSITION | COMPUTER OPERATION |
| --- | --- |
| ION | Interrupt on |
| EXEC | Execute |
| FETCH | Fetch |
| STORE | Store |
| ISZ | Increment memory automatically |
| DSZ | Decrement memory automatically |
| DATCH | Data channel |
| DEFER | Defer |
| ACCO-ACC3 | Four computer accumulator registers |

It will be noted that the majority of the above-noted parameters are conventional operations of the digital computer. The ACCO-ACC3 positions of the switch enable selection of any one of four accumulators within the computer which are desired to be monitored. By operation of the switch 60, in combination with operation of the thumb wheel switches 34 and 36, various combinations of breakpoint addresses and parameters may be set into the system for use in the breakpoint or snapshot mode. For example, breakpoint operation may be initiated when the computer is operating in one of the parameters selected by switch 60 and when a selected breakpoint address is executed.

Nine Buffer Store LEDS 62 correspond to modes selectable by switch 48 and the circular switch 60. When data is stored in the memory 16 from the computer 10 during operation in the snapshot or breakpoint mode, the respective one of the LEDS 62 lights up to indicate which parameter is being presently stored. The Buffer Store LEDS 62 thus indicate to the operator which parameter is being stored in case multiple parameters have been input into the system.

Eight Mode Active LEDS 64 correspond to various settings of the mode select switch 60. A three position toggle switch 66 is operable between a normally off position and a load and clear position. When the switch 66 is placed in the load position, the parameter selected by the mode select switch 60 is loaded into the system. At this time, the respective one of the LEDS 64 lights up to indicate which parameter has been selected through the switch 60. More than one of the LEDS 64 may be lighted at one time in case multiple parameters are selected.

LEDS 68 may be selectively illuminated in order to indicate the occurrence of the storage of interrupt on or carry conditions. A toggle switch 70 is operable between display accumulate and clear positions in order to enable selective clearing of the accumulator registers or selected display of the accumulator registers in the data display 40.

In operation of the system in the sentinel mode, switch 44 is placed in the on position, the comprehensive clear toggle switch 46 is operated in order to initialize the device and the toggle switch 48 is placed in the central position to place the system in the sentinel mode. No further action is needed by the user until the computer stops because of a malfunction or the like. At this time, the last sixteen instructions will be stored in memory 16. The user may then operate the toggle switch 56 in order to visually display the address and data related to each stored instruction in displays 38 and 40. The particular one of the sixteen instructions being reviewed is denoted by the pointer display 42.

In operation of the breakpoint mode, the toggle switch 48 is pressed upwardly and the thumb wheel switches 34 are manually operated in order to set a desired breakpoint address into the system. The thumb wheel switch 36 is placed in the number one position to denote the first breakpoint address register. The breakpoint mode toggle switch 54 is then toggled upwardly in order to load the desired address into the system. The toggle switch 36 may then be moved to the second and third positions and two additional addresses may be dialed into the switch 34 and loaded in the system. If desired, thumb wheel switch 36 may be moved to the fourth and fifth positions, in conjunction with operation of the thumb wheel switches 36, in order to load the desired breakpoint range into the system. In addition, the mode select circular switch 60 is operated in conjunction with the mode loading toggle switch 66 in order to load desired parameters into the breakpoint circuitry, if desired.

The system thus allows a substantial amount of flexibility in the breakpoint mode. For example, only one breakpoint address may be entered into the thumb wheel switches 34 and the computer will be stopped when that address is reached, regardless of the computer parameter involved therewith. The last sixteen instructions prior to the breakpoint adddress may then be displayed on displays 38 and 40 by operation of the toggle switch 56. Alternatively, three breakpoint addresses may be entered into the register 34 and the computer will be stopped upon the occurrence of any one of the three addresses. Similarly, a breakpoint range defined by upper and lower addresses may be entered into the thumb wheel switches 34 and 36 and the computer will be stopped when any address within the input range is reached.

The breakpoint addresses may be further modified by operation of the mode select switch 60, in association with the mode loading switch 66, such that the computer is only stopped when the computer reaches the addresses input into the thumb wheel switches 34 and 36 when the computer is in the desired mode. For example, addresses 1000 to 3000 may be entered through the thumb wheel switches 34 and 36, in association with FETCH and STORE parameters through operation of the switches 60 and 66. In such a case, the computer would only be stopped when an address within the range of 1000–3000 occurred when the computer was in the FETCH or STORE modes. When the computer stops, the last sixteen program instructions would be stored in the memory 16 and could be visually displayed on displays 38 and 40 by operation of the toggle switch 56. The Mode Active LEDS 64 indicate which of the parameter modes are input into the system. The Buffer Store LEDS 62 indicate which parameter was occurring at the time the computer stopped.

In operation in the snapshot mode, the input of an instruction address and selected parameters is similar to that in operation of the breakpoint mode. However, in the snapshot mode, it is also possible to store the contents of any one of four accumulatr registers of the computer, without interfering with operation of the computer. In order to store the contents of an accumulator register, the rotary switch 60 is placed on the desired accumulator number and the accumulator display toggle switch 70 is operated. Upon the storage of the contents of an accumulator register, the digits in the desired accumulator register are displayed on display 40. A toggle switch 70 may be depressed in order to clear the stored accumulator data.

It will thus be seen that the present invention provides a substantial amount of flexibility in monitoring the operation of a computer. While sixteen storage cells each having a forty bit capacity have been disclosed for use in the memory 16, it will be understood that a greater or lesser number of memory stages may be utilized in dependence upon the storage capacity required for a particular computer.

Figure 3:
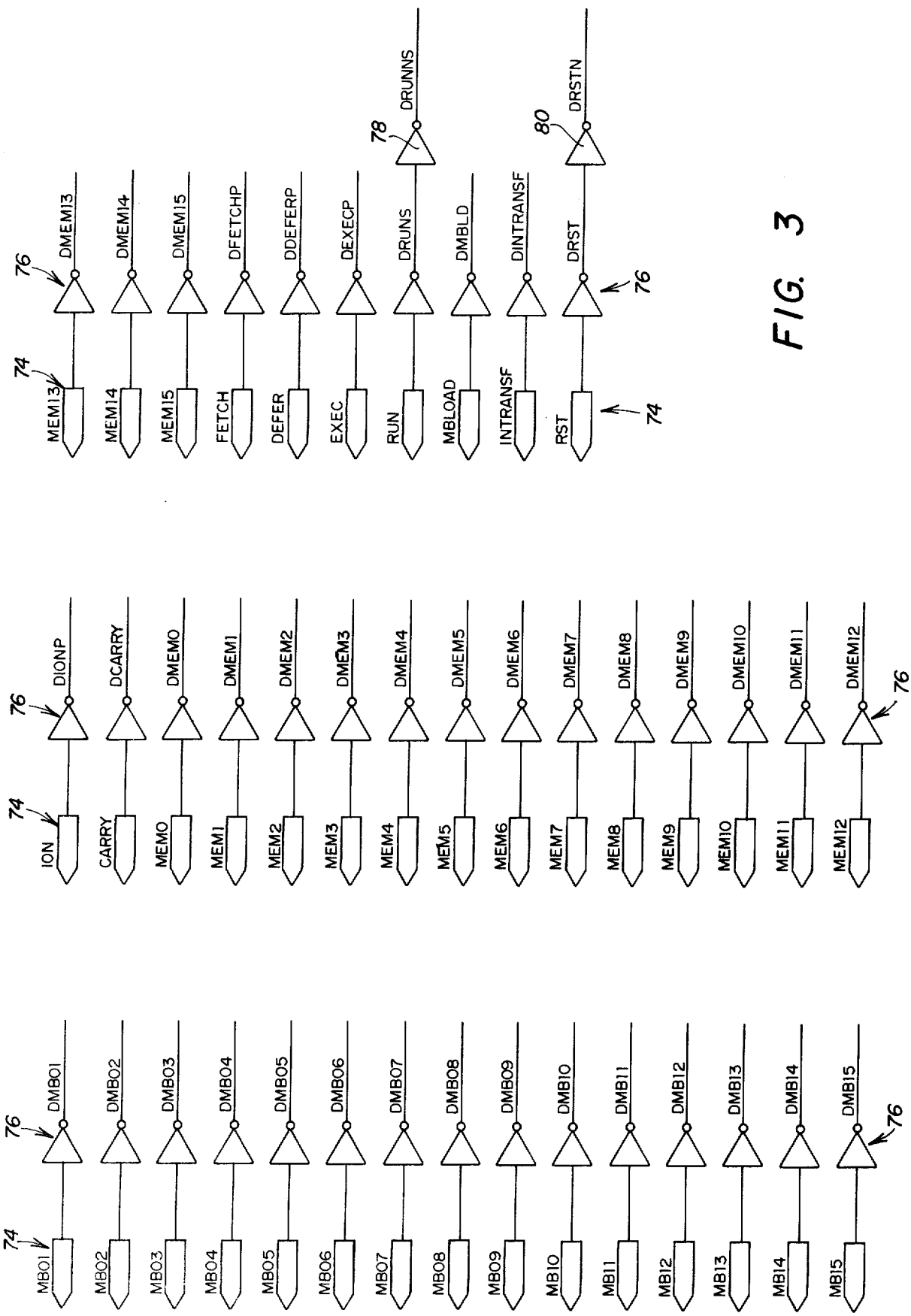
FIG. 3 is a connection diagram for the interconnection of the present system to the back plane of a particular digital computer.

FIG. 3 illustrates the connection between the back plane 12 of the computer 10 and the present system. The forty terminals 74 are identified by legends MB01-MD15, ION-MEM12 and MEM13-RST which correspond to the terminals appearing on the back plane of a 1200 Nova mini-computer manufactured and sold by Data General Corporation. Such back plane terminals will vary of course when the present system is utilized with different types of computers. The signals appearing at the back plane of the computer are applied through invertors 76 to generate signals DMB01-DMB15, DIONP-DEMEM12 and DEMEM13-DRST. In addition, signal DRUNS is applied through an invertor 78 to generate signal DRUNNS. Signal DRST is applied through an invertor 80 to generate the signal DRSTN. It will be understood that the circuitry shown in FIG. 3 will generally be incorporated into a multi-wire cable and that connector pins, not shown, will be incorporated between the cable and the computer back plane.

Throughout the specification, the following rules will be incorporated in the designation of identifying system signals:

the output of a gate will begin with the letter D,
the output of a flipflop or multivibrator will begin with the letter F,
a clock signal will begin with the letter Q,
the output from a toggle or rotary switch will begin with the letter P,
the output from a thumb wheel switch will begin with the letter S, and
the signal applied to control a light emitting diode will begin with the letter L.

Figures 4, 5:
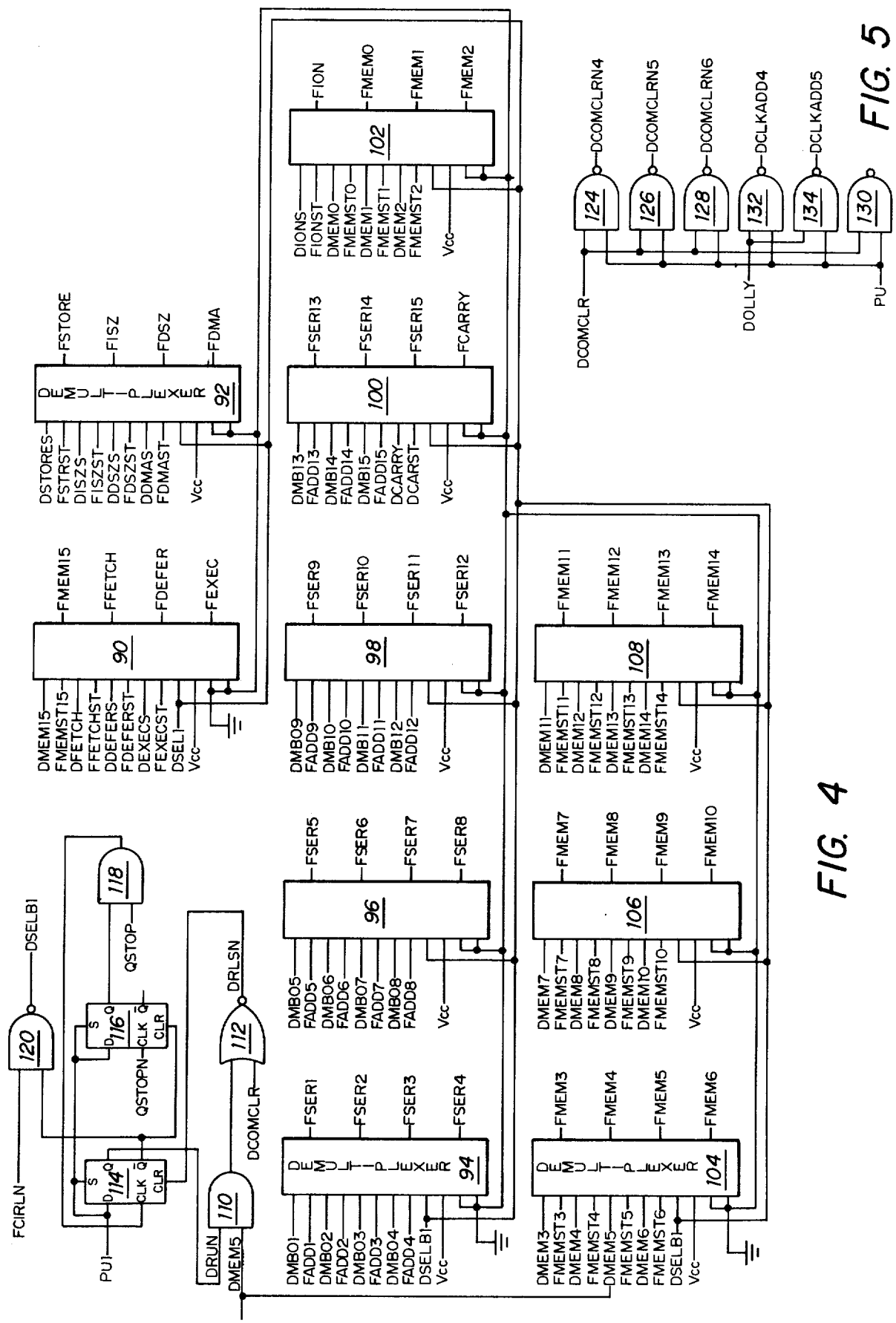
FIG. 4 is a schematic diagram of multiplexing circuitry for applying selected signals into the storage buffer matrix of the system.
FIG. 5 is a schematic diagram of logic circuitry for applying clock and clearing signals to the storage buffer matrix.

FIG. 4 is a schematic diagram of multiplexing circuitry for applying selected signals to the storage buffer matrix, or memory 16, of the invention. This circuit includes ten two-line to one-line demultiplexers 90-108. For example, the demultiplexers may comprise SN74157 two-line to one-line demultiplexers. The signals applied to the left hand side of each demultiplexer comprise signals from the back plane of the computer derived from the circuitry shown in FIG. 3 and further comprise signals from the storage buffer matrix in order to place circulating bits back in the buffer when the buffer is "wrapped around" during its permanent storage phase. The outputs from the multiplexers 90-108 are applied to the buffer storage matrix (memory 16).

The DMEM5 signal is applied as an input to the demultiplexer 104 and is also applied as an input to an AND gate 110. The output of gate 110 is applied, along with the signal DCOMCLR, to the inputs of a NOR gate 112. AND gate 110 may comprise for example an SN7408 gate, while gate 112 may comprise for example an SN7404 gate. The output of gate 112, DRLSN, is applied to the clear terminal of a D-flop 114. Circuit 114 may comprise for example a SN7474 D-flop. The Q terminal of the D-flop 114 is applied to the clear terminal of a second D-flop 116, the Q terminal of which is applied to an input of an AND gate 118. The QSTOP signal is applied through gate 118 to the clock terminal of the D-flop 114. The PU1 signal is applied to the D and S terminals of both D-flops 114 and 116. The Q terminal of D-flop 114 is applied, along with signal FCIRLN, to the inputs of a NAND gate 120. Gate 120 may comprise for example an SN7400 gate. The signal DSELB1 determines what LED displays are to be enabled.

FIG. 5 illustrates logic circuitry for applying clock and clearing signals to the storage buffer matrix. The DCOMCLR signal is applied to inputs of NAND gates 124, 126 and 130. The DOLLY signal is applied to inputs of NAND gates 132 and 134. The PU signal is applied to inputs of each of the gates 124-130. The outputs of the gates 124-134 comprise clearing signals DCOMCLRN4-DCOMCLRN6 and clock signals DCLKADD4 and DCLKADD5. These clock and clearing signals are applied to the buffer storage matrix shown in FIG. 6.

Figure 6:
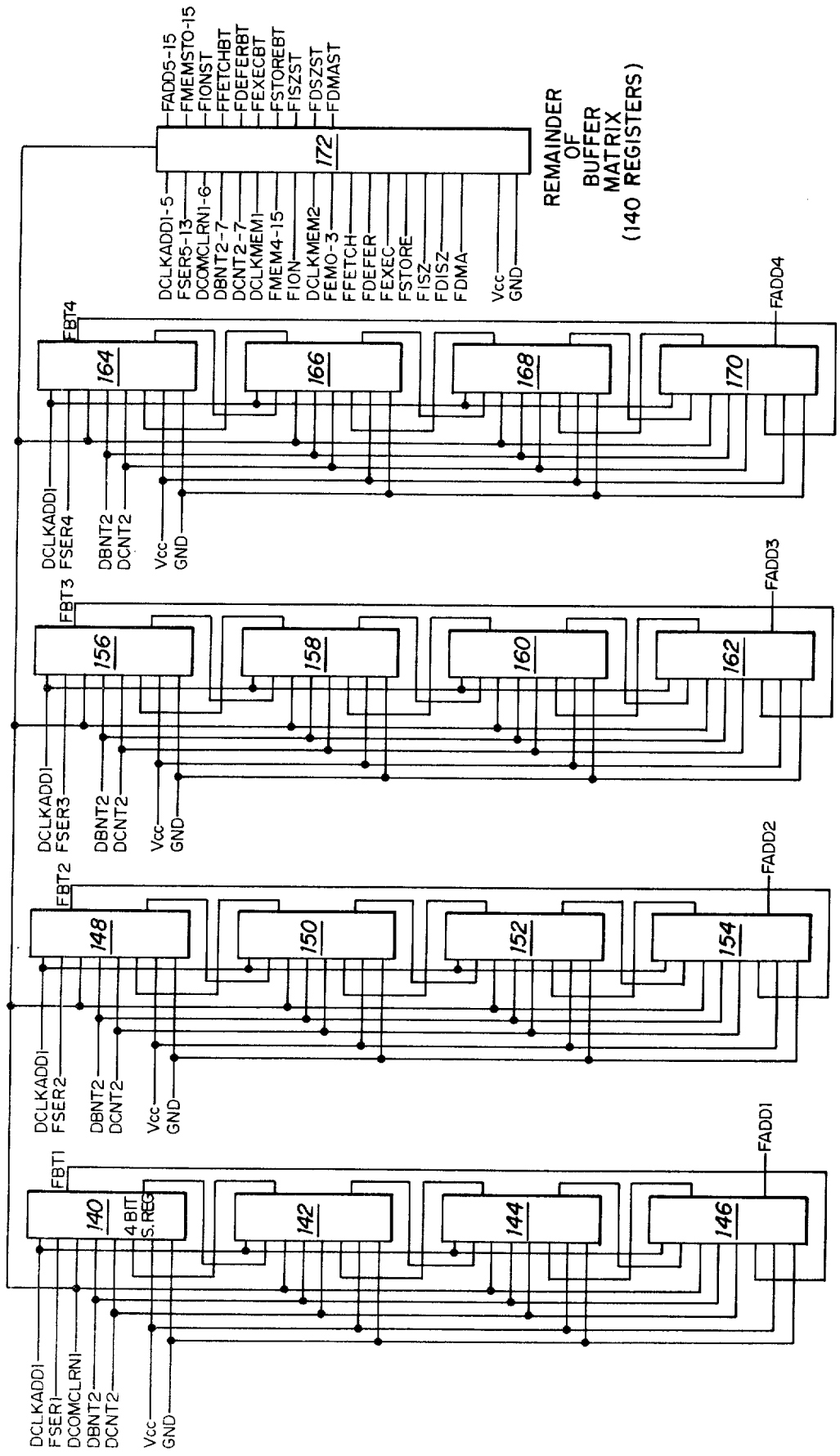
FIG. 6 is a schematic diagram of the storage buffer matrix of the system.

FIG. 6 illustrates the storage buffer matrix, or memory 16, shown in FIG. 1. This matrix comprises 156 four bit serial bi-directional shift registers arranged in a matrix configuration. The purpose of the storage buffer matrix is to temporarily store each representation of a program instruction output from the back plane of the computer 10. The matrix normally comprises a first in-first out serially connected sixteen stage memory, each stage having the capacity to store forty parallel bits. Each group of forty parallel bits comprises fifteen address bits, sixteen data bits, one carry bit and eight status bits. These bits define the address and contents of each program instruction carried out by the computer 10.

In operation, the representation of the first program instruction executed by the computer is applied to the input of the storage matrix and the forty bits are temporarily stored in the first stage of the matrix. Upon the execution of the next program instruction by the computer, the temporarily stored first instruction is dropped to the second stage of the matrix and the second program instruction is stored in the first stage of the matrix. In this manner, subsequent program instructions are applied to the input of the storage matrix and the first forty bit storage instruction word is "dropped through" the matrix stage by stage. After the first program instruction has been stored in all sixteen stages of the matrix, the program instruction is applied to the output of the matrix and is "dumped". In the same manner, each subsequent program instruction and the address therefor is dropped through the matrix and is temporarily stored in each successive one of the sixteen stages of the matrix.

Upon the occurrence of a predetermined state of operation of the computer, such as a malfunction of the computer when the present system is in the sentinel mode, the output of the matrix is connected to the input and the memory is then interconnected as a first in-last out memory so that the last executed instruction may be displayed first. The sixteen forty bit words stored in the matrix may be circulated from the output to the input of the memory in a continuous manner and is thus permanently stored until cleared.

Referring to FIG. 6, sixteen four bit serial bidirectional shift registers 140-170 are illustrated. Signals DCLKADD1, DCOMCLRN1 are applied to each of the shift registers 140-170. Signals FSER1-FSER4 are individually applied to respective ones of the registers 140, 148, 156 and 164. Signals DBNT2 and DCNT2 are applied to each one of the registers 140-170. Output signals FBT1-FBT4 and FADD1-FADD4 are output from respective ones of the registers 146, 154, 162 and 170.

For clarity of illustration, only approximately one-ninth of the buffer storage matrix is illustrated in detail in FIG. 6. The remainder of the buffer matrix, which comprises 140 registers interconnected in eight groups of sixteen in a similar manner as that shown by registers 140-170, are included in the block 172. As shown, the input signals applied to the various shift registers are signals DCLKADD1-5 through signal FDMA. The output signals from the remainder of the matrix, signals FADD5-15 through FDMAST are also illustrated as being generated from the output of the block 172.

Figure 7:
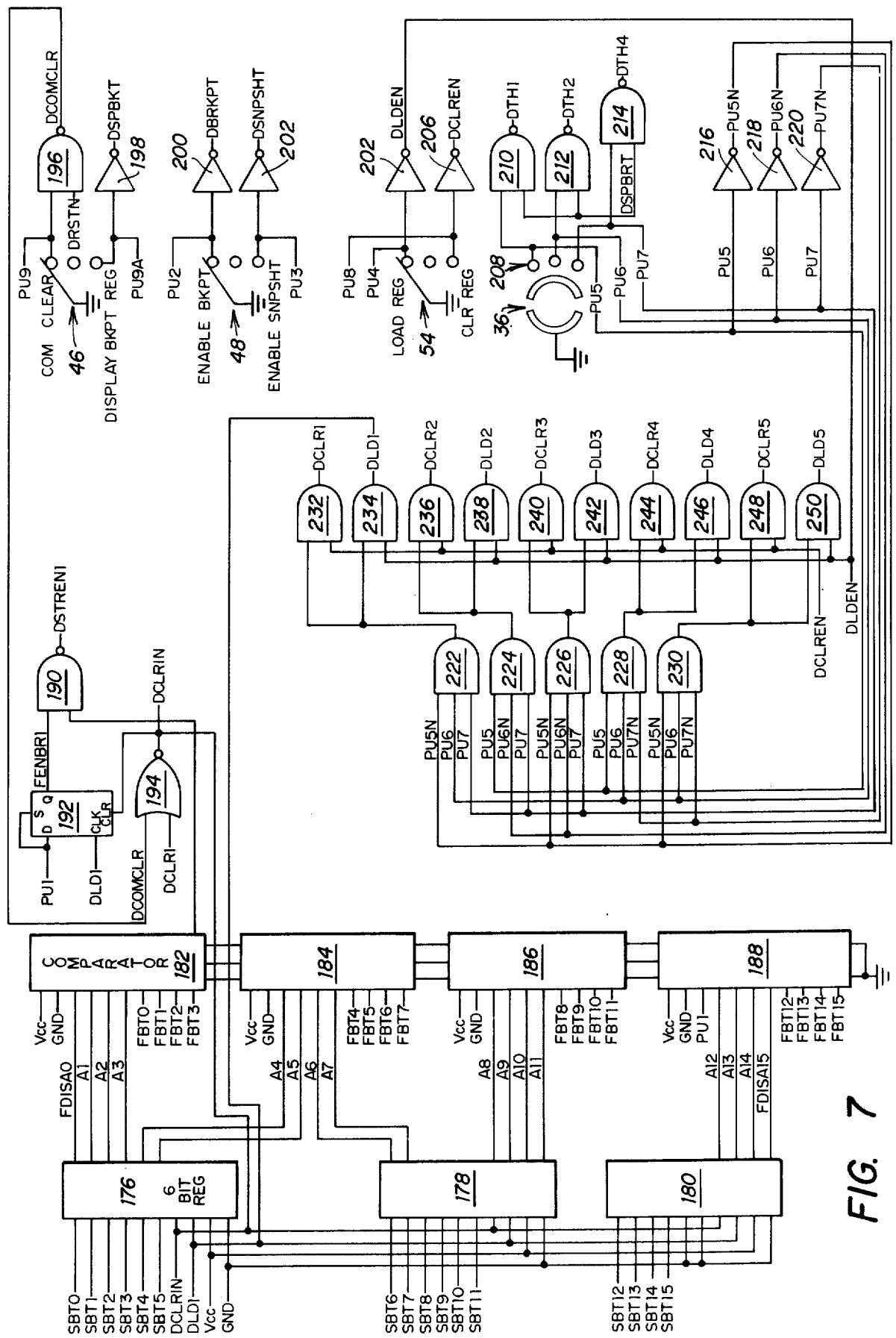
FIG. 7 is a schematic diagram of logic circuitry for applying thumb wheel switch settings into registers and the mode select switches and associated circuitry.

Referring to FIG. 7, a schematic diagram is illustrated of logic circuit for applying the various thumb wheel switch settings into registers. Signals from the thumb wheel switch 34, SBT0-SBT5, SBT6-SBT11 and SBT12-SBT15, are applied to the inputs of six bit storage registers 176, 178 and 180, respectively. Registers 176-180 may comprise for example six bit storage registers SN74174. The various signals SBT0-SBT15 thus constitute the address set into the breakpoint register 34. The data stored in the registers 176-180 are applied to comparators 182-188. The comparators 182-188 may comprise for example SN7485 comparators. The output from comparator 182 is applied to an input of a NAND gate 190. A flipflop 192 generates the FENBR1 signal which is applied to the second input of the gate 190. The DCOMCLR and DCLR1 signals are applied to inputs of a NOR gate 194, the output of which is applied to the clear terminal of the flipflop 192 and which generates the DCLRIN signal. The DCLRIN signal is applied to an input of the six bit register 176.

FIG. 7 also illustrates the toggle switches 46, 48 and 54 previously identified in FIG. 2. The COMCLEAR terminal of the switch 46 is applied to an input of a NAND gate 196, the output of which comprises the signal DCOMCLR which is applied as an input to gate 194. The display breakpoint register terminal of the switch 46 is applied through a invertor 198 to generate the DSPBKT signal. The COMCLEAR signal also generates the PU9 signal, while the display breakpoint register terminal generates the PU9A signal.

The enable breakpoint terminal of the switch 48 generates the PU2 signal and also generates through the invertor 200 the DBRKPT signa. The enable snapshot terminal of the switch 48 generates the PU3 signal and generates through the invertor 202 the DSNPSHT signal. The load register terminal of the toggle switch 54 generates the PU4 signal and generates through the invertor 204 the DLDEN signal. The clear register terminal of switch 54 generates the PU8 signal and generates through the invertor 206 the DCLREN signal.

The breakpoint register number thumb wheel switch 36 comprises three terminals 208 to enable selection of the three breakpoint registers available. The first terminal generates the PU5 signal and generates through the NAND gate 210 the DTH1 signal. The second terminal of switch 36 generates the PU6 signal and generates through the NAND gate 212 the DTH2 signal. The third terminal of the switch 36 generates the PU7 signal and generates through the NAND gate 214 the DTH4 signal. The DSPBRT signal, previously generated by invertor 198, is applied to the inputs of NAND gates 210-214.

The PU5, PU6 and PU7 signals are applied through invertors 216-220 respectively, to generate signals PU5N-PU7N which are applied to inputs of AND gates 222-230. In addition, signals PU5-PU7 are applied to inputs of gates 222-230. The outputs of gates 222-230 are applied to inputs of AND gates 232-250. In addition, the DCLREN and DLDEN signals are applied to inputs of the gates 232-250. The outputs of AND gates 232-250 designate which registers are to be loaded with data. The output DLD1 from gate 234 is tied to inputs of the registers 176-180. The remaining outputs from gates 232-250 are applied to control registers to be subsequently described.

FIG. 8 is a schematic diagram of additional registers for receiving settings from the thumb wheel switches 34. The circuitry shown in FIG. 8 is somewhat similar to the circuitry described with respect to FIG. 7 and includes three six bit storage registers 254-258. The registers receive inputs from the thumb wheel switches 34 and generate outputs to four comparators 260-266. The output from comparator 260 is applied to an input of a NAND gate 268 which generates the DSTPEN2 signal. The DCMCLR and DCLR2 signals are applied to a NOR gatd 270, the output of which generates the DCLR2N signal which is applied to the clear terminal of a flipflop 272.

FIG. 9 illustrates four terminals of the multiposition circular switch 60 previously shown in FIG. 2. The four terminals correspond to the accumulator selection terminals ACC0-ACC3 shown in FIG. 2. The remainder of the circular switch 60 is illustrated in FIG. 11, to be subsequently described. The four terminals of the accumulator select portion of the switch 60 generate signals PU31-Pu34.

FIG. 10 illustrates the toggle switch 66 which may be operated between three positions to generate the PU10 and PU11 signals. The Pu11 signal is applied through an invertor 280 to generate the DCDMD signal. The PU10 signal is applied through an invertor 282 to generate the DCLRMD signal.

FIG. 11 illustrates circuitry associated with the parameter select switch 60. Operation of the switch 60 generates signals PU12-PU20, as illustrated. The signal PU12 is applied through an invertor 284 to generate the DION signal. Signal PU13 is applied through invertor 286 to generate the DSTORE signal. PU14 is applied through invertor 288 to generate the DFETCH signal. Signal PU15 is applied through an invertor 290 to generate the DEXEC signal. Signal PU16 is applied through an invertor 292 to generate the DISZ signal. Signal PU17 is applied through invertor 294 to generate the DDSZ signal. Signal PU19 is applied through an invertor 296 to generate the DDMA signal. Signal PU20 is applied through invertor 298 to generate the DDFR signal. These signals DION-DDFR are applied to control the parameters of the system during breakpoint and snapshot modes as previously described.

Figure 12:
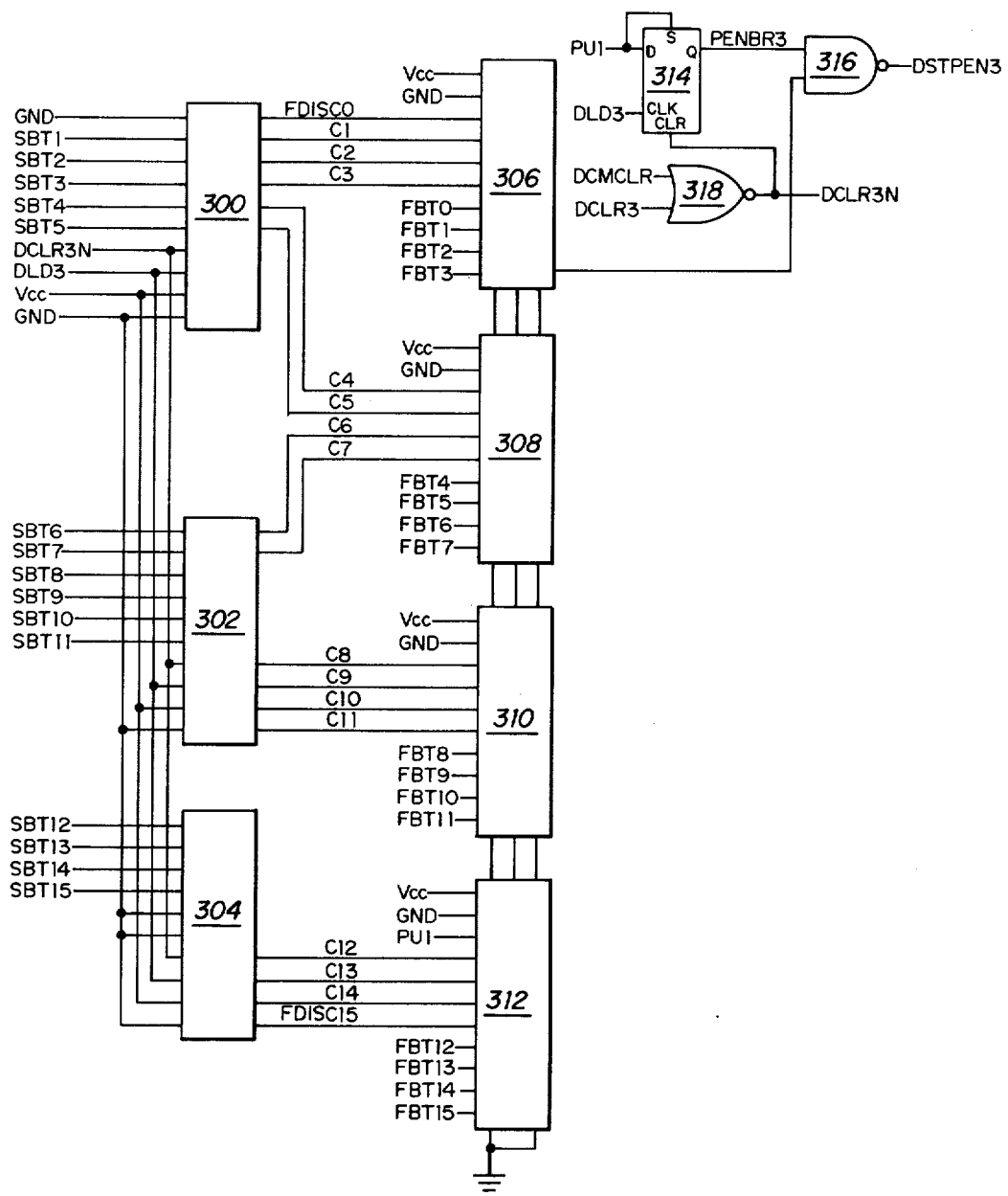
FIG. 12 is a schematic diagram of register circuitry for receiving thumb wheel switch settings to enable control of breakpoint or snapshot mode parameters.

FIG. 12 illustrates circuitry for loading the registers from the thumb wheel switches and for determining when the computer has reached the specified point of execution. As previously noted, the outputs from the thumb wheel switches 34 may be loaded into six bit storage registers 300–304, when the registers are selected by operation of the thumb wheel switch 36 as shown in FIG. 7. The outputs from the registers 300–324 are applied to four comparators 306–312 which compare the register contents with signals FBT0-FBT15 applied from the storage buffer matrix shown in FIG. 6. When the signals applied from the storage buffer 300–304 are equal to the inputs applied to the comparator from the storage buffer matrix, the computer is at the breakpoint program execution. When register 300 is loaded, the flipflop 314 is armed. When the comparator 306 seeks a matched address, NAND gate 360 generates the DSTPEN3 signal to tell the computer to stop at that breakpoint. Signals DCMCLR and DCLR3 are applied through a NOR gate 318 to generate the DCLR3N signal.

Figure 13:
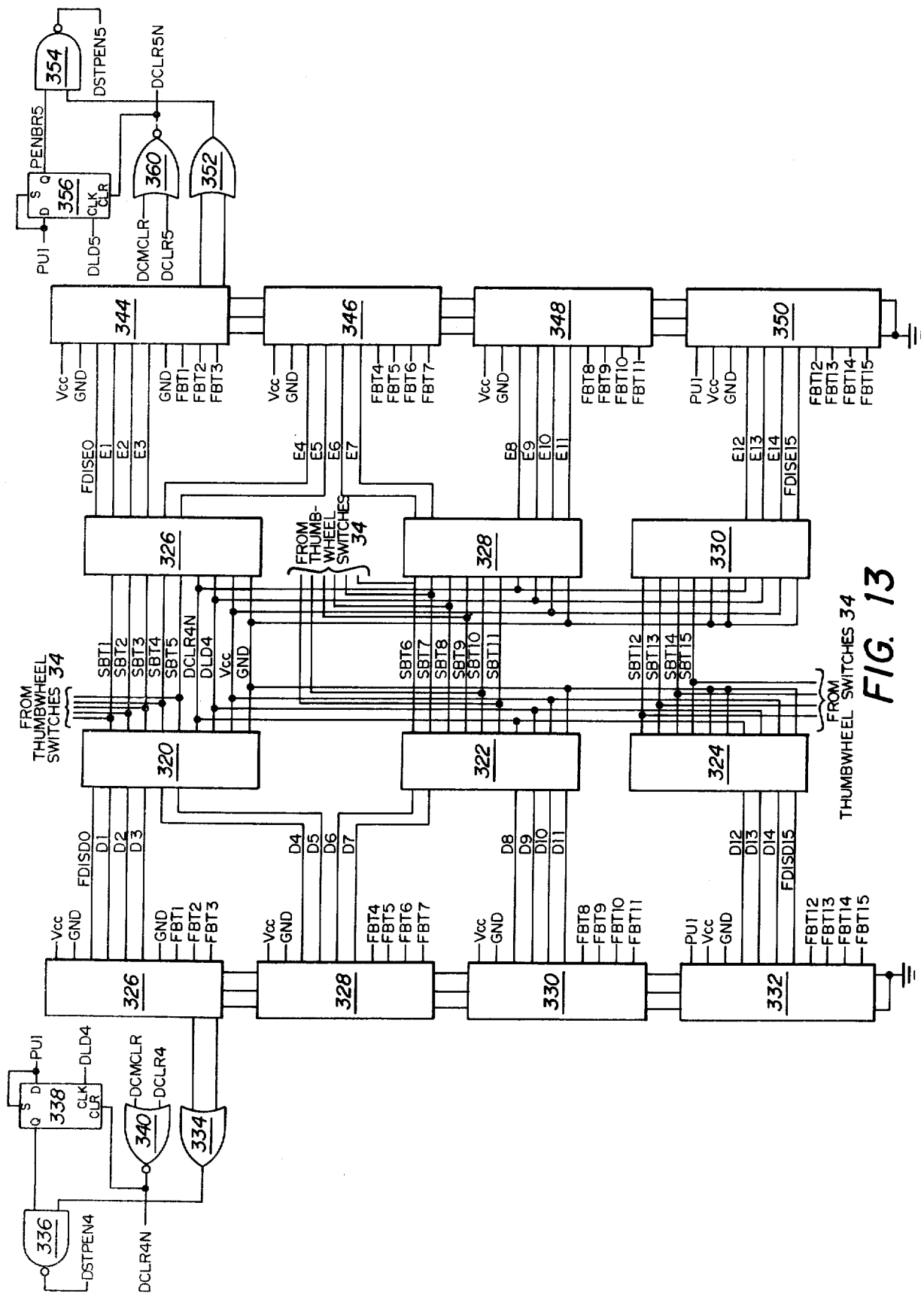
FIG. 13 is a schematic detail of registers for receiving thumb wheel switch settings.

FIG. 13 illustrates circuitry for receiving the address set in the thumb wheel switches 34 when it is desired to input a breakpoint range by operation of the thumb wheel switch 36 shown in FIG. 2. The settings from the thumb wheel switches 34 are applied to six bit storage registers 320–330 in the manner previously described. The outputs from registers 320–324 are applied to four comparators 326–332. Comparators 326–332 also receive inputs representative of the contents within the first stage of the buffer storage matrix. When it is determined that the contents of the buffer storage matrix are the same as the address input into the registers 320–324, the condition is sensed by a NOR gate 334 and the NAND gate 336 to generate the DSTPEN4 signal. A flipflop 338 is armed upon the loading on register 326 in the manner previously described. A NOR gate 340 receives DCMCLR and DCLR4 in order to generate DCLR4N. Similarly, the outputs of registers 326–330 are applied to four comparators 344–350 which also receive inputs from the buffer storage matrix. Detection of a match is applied through a NOR gate 352 and a NAND gate 354 in order to generate a DSTPEN5 stop signal for the computer. The flipflop 356 is armed upon the loading of register 326 in the manner previously described. A NOR gate 360 is operable to generate the signal DCLR5N upon suitable logic conditions.

Figure 14:
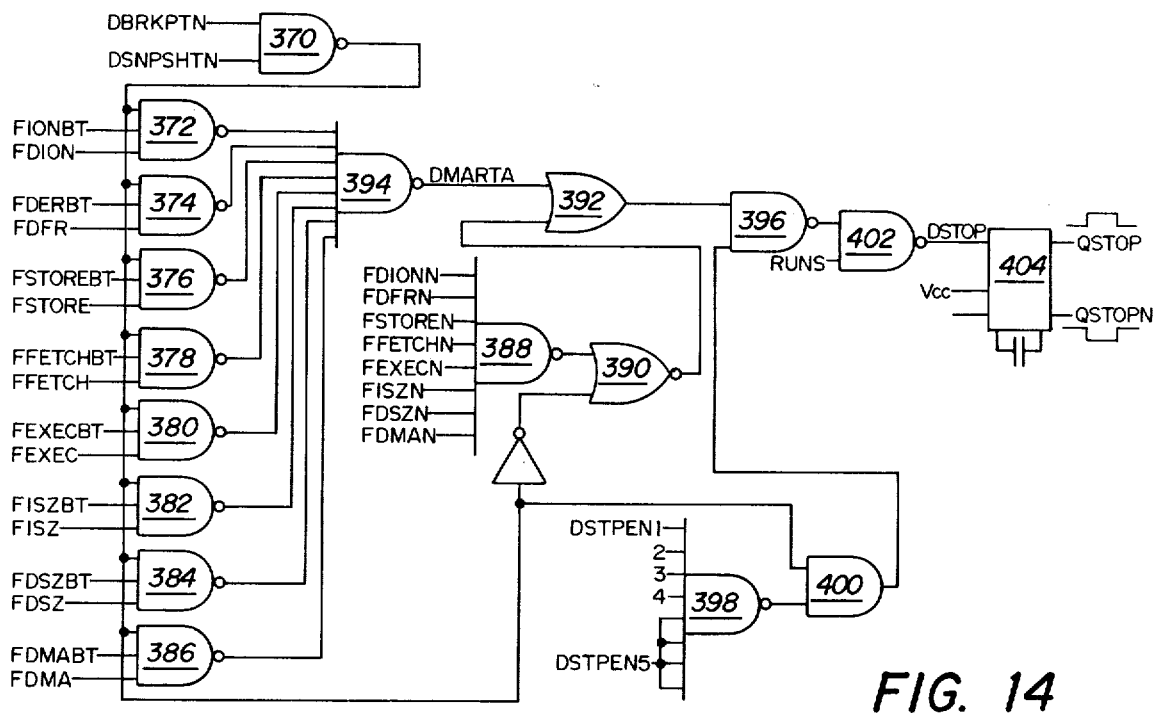
FIG. 14 is a schematic diagram of stop logic for enabling termination of operation of the computer in the breakpoint mode.

FIG. 14 illustrates stop logic for enabling termination of the computer during the breakpoint mode. Signals DBRKPTN and DSNPSHTN are applied to inputs of a NAND gate 370 in response to the positioning to the toggle switch 48 shown in FIGS. 2 and 7. Signals are applied to the inputs of NAND gates 372–386 from the output of the buffer matrix shown in FIG. 6. Signals FDIONN-FDMAN are applied to a multi-input NAND gate 388, the output of which is applied through a NOR gate 390 to an input of an OR gate 392. The outputs of gates 372–386 are applied to a multi-input NAND gate 394, the output of which is applied to the second input of gate 392. The output of gate 392 is applied to an input of a NAND gate 396.

Signals DSTPEN1-DSTPEN5 are applied to the input of a multi-input NAND gate 398. Signals DSTPEN1-5 are generated from the comparator circuits shown in FIGS. 7, 8, 12 and 13 previously described. The output of gate 398 is applied to an input of an AND gate 400, the output of which is applied to gate 396. The output of gate 396 is applied through a NAND gate 402 to generate the DSTOP signal to a one shot multivibrator 404. Multivibrator 404 generates the QSTOP signal as illustrated which operates to stop operation of the computer. Thus, circuitry of FIG. 14 operates to terminate operation of the computer if the system is in a breakpoint mode and an instruction having the correct parameter and address is received from the computer.

Figure 15:
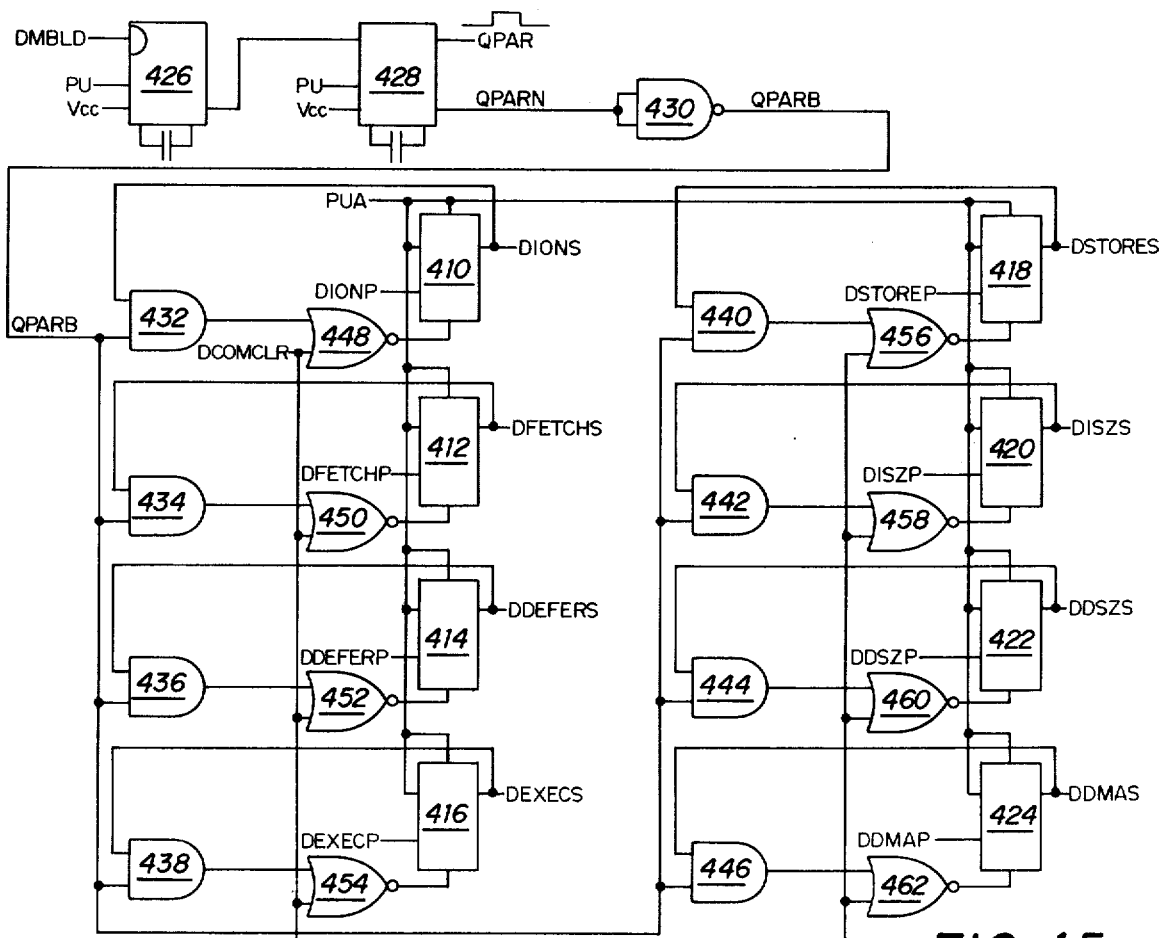
FIG. 15 is a schematic diagram of logic circuitry for the computer mode status storage.

FIG. 15 illustrates the computer mode status storage circuitry for detecting the mode in which the computer is presently operating. The circuitry only stores once a cycle. the DIONP, DFETCHP, DDEFERP, DEXECP, DSTOREP, DISZP, DDSZP and DDMAP signals are received from the back plane of the computer through the cable shown in FIG. 3 and are applied to terminals of D-flops 410–424, respectively. The signal PUA is applied to each of the D-flops 410–424. A one shot 426 receives the clock signal DMBLD and is interconnected with a second one shot 428 which is operable to generate the QPAR or QPARN signals. The QPARN signal is applied to both inputs of a NAND gate 430 which generates the QPARB signal for application to AND gates 432–446.

The outputs of gates 432–436 are applied through NOR gates 448–462, respectively. The outputs of gates 448–462 are connected to terminals of the D-flops 410–424, respectively. In operation of the circuitry shown in FIG. 15, D-flops 410–424 are cleared and waiting to be loaded. Upon the reception of DMBLD, after a 100 nanosecond delay due to the one shots 426 and 428, the signal QPAR is generated and causes the generation of a clear signal DCOMCLR which is applied through the NOR gates 448–462. The circuitry shown in FIG. 15 thus insures that the data is correctly stored in the main storage buffer, after which the data is then cleared.

Figure 16:
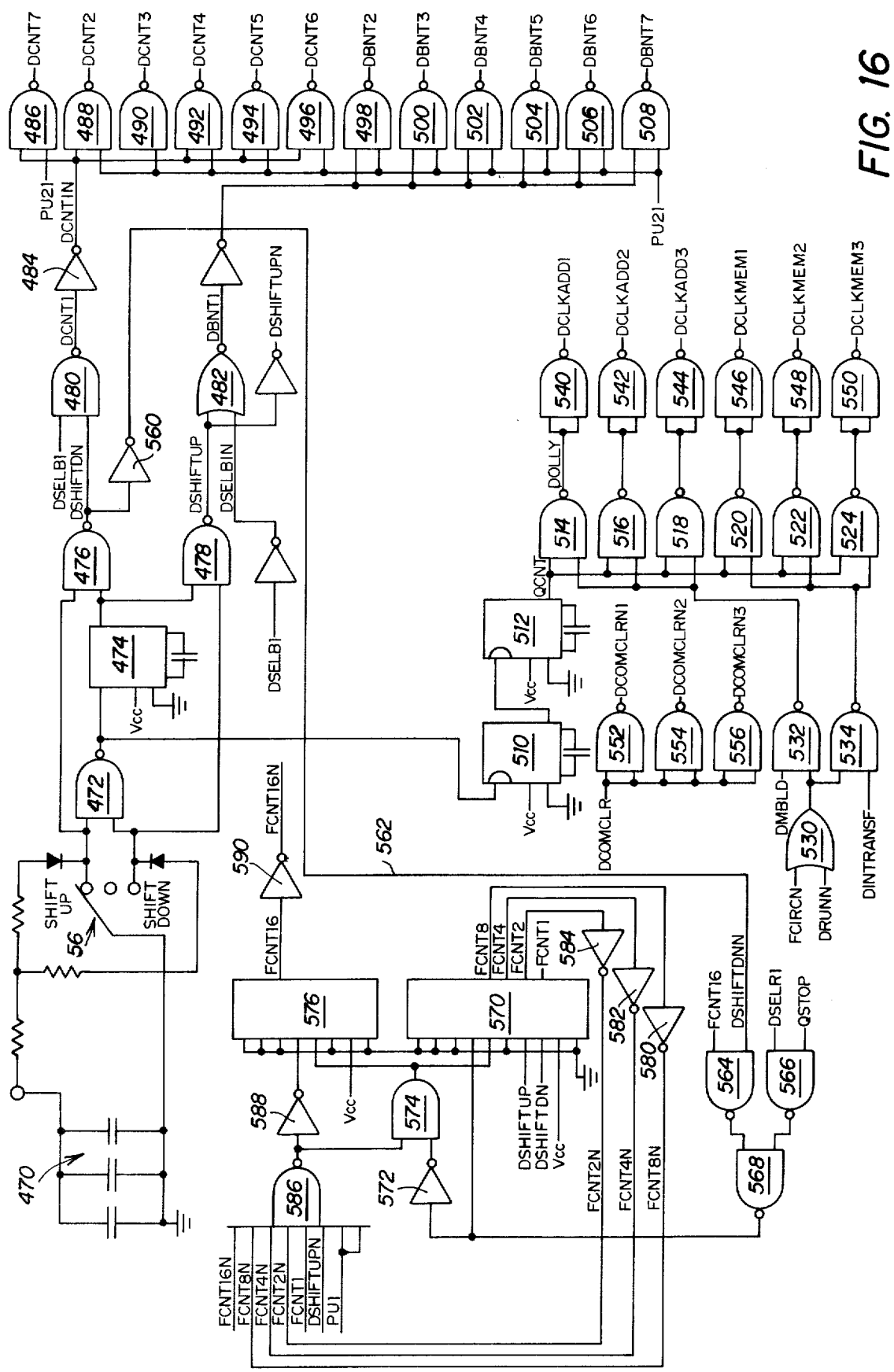
FIG. 16 is a schematic diagram of logic circuitry operable in response to the shift up or shift down toggle switch and for gating and operating display circuitry.

FIG. 16 illustrates logic circuitry operable in response to the shift up or shift down toggle switch 56 previously shown in FIG. 2. Capacitors 470 are connected across the toggle switch 56 which is movable between shift up and shift down terminals. The terminals are tied to the inputs of a NAND gate 472, the output of which is applied to a monostable multivibrator 474. Terminals of the one shot 474 and the switch terminals are applied to inputs of NAND gates 476 and 478 which generate shift up and shift down signals which are applied to a NAND gate 480 and a NOR gate 482 respectively. A DCNT1 signal is applied through an invertor 484 to AND gates 486–508 which generate signals DCNT7-DBNT7 which are applied to the storage matrixes shown in FIG. 6 and which are also utilized to gate the displays of the system.

The output of gate 472 is applied to a monostable multivibrator 510 which is tied to a monostable multivibrator 512. The one shot multivibrator 512 is connected to inputs of NAND gates 514–524. Signals FCIRCN and DRUNN are applied through an OR gate 530 and NAND gates 532 and 534 to additional inputs of gates 514–524. The output of gates 514–524 are applied to NAND gates 540–550 which generate the signal DCLKADD1-DCLKMEN3 which are clocks for the address and data storage buffers of the matrix shown in FIG. 6. The DCOMCLR signal is applied to NAND gates 552–556 to generate the DCOMCLRN1-3 signals which are applied to clear the buffer storage matrix shown in FIG. 6.

The DSHIFTDN signal is applied through an invertor 560 to a lead 562 to an input of a NAND gate 564. The output of gate 564 is applied, along with the output of gate 566, to a NAND gate 568. The output of gate 568 is applied to an up-down counter 570 and through an invertor 572 and AND gate 574 to a second up-down counter 576. Counters 570 and 576 may comprise for example SN74193 counters. The outputs FCNT8-2 from counter 570 are applied through invertors 580–584, respectively, to a multi-input NAND gate 586, the output of which is applied through an invertor 588 to the counter 576. The inputs applied to gate 586 comprise the decoded outputs from the gates 486–508 previously noted. The output of counter 576 comprises a signal FCNT16 which is applied through an invertor 590. In operation of the circuitry shown in FIG. 16, the toggle switch 56 is operated in order to move the data stored in the buffer storage matrix from one stage to another in order to allow the operator to visually review all sixteen storage instruction words in the memory.

Figure 17:
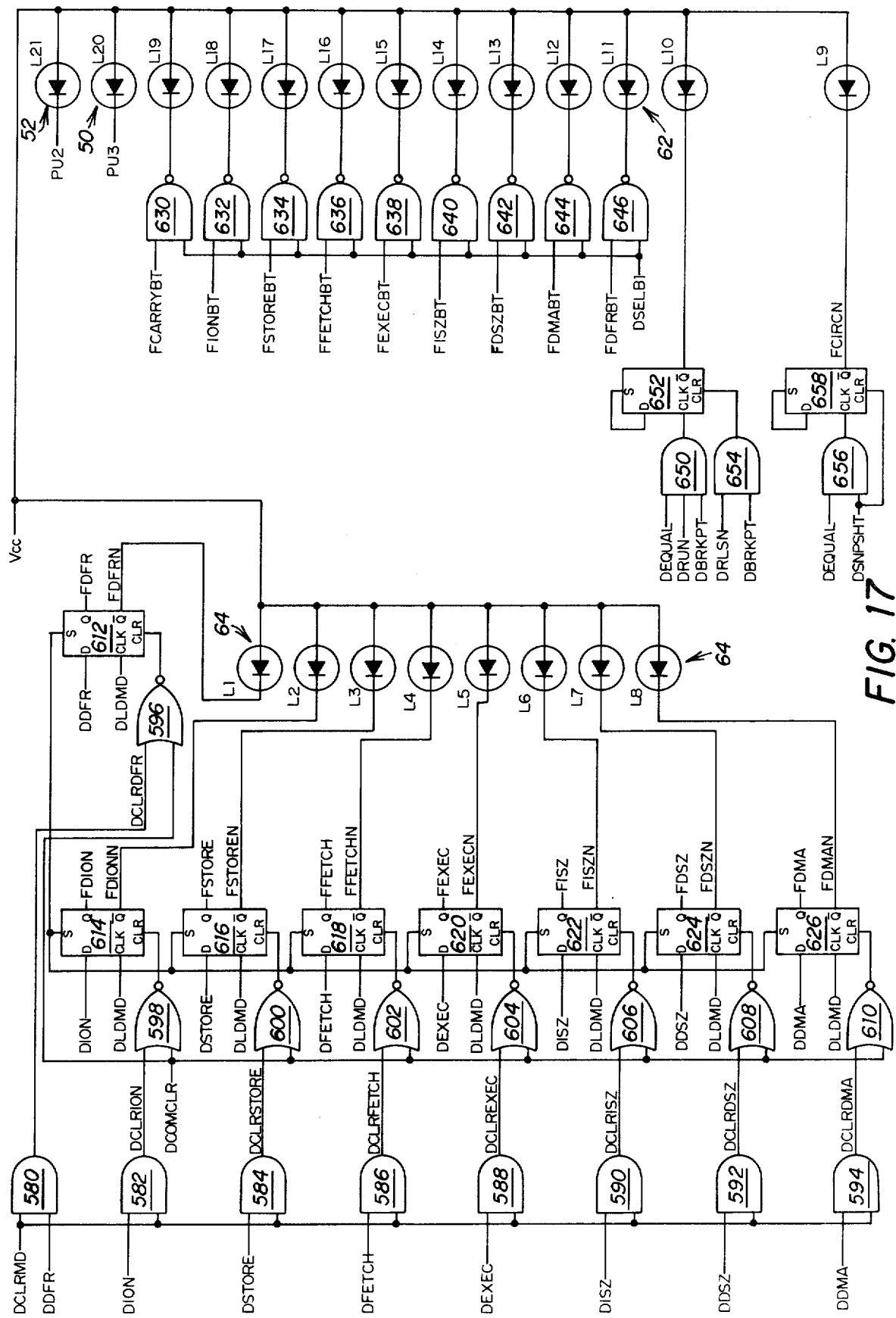
FIG. 17 is a schematic illustration of the light emitting diode display on the front panel of the console shown in FIG. 2.

FIG. 17 illustrates circuitry for controlling the LED displays on the front of the console shown in FIG. 2. Signals DCLRMD-DDMA, generated from the circular switch 60 as shown in FIG. 11, are applied to inputs of AND gate 580–594, respectively. The outputs of gates 580–594 are applied to inputs of NOR gates 596–610, the outputs of which are applied to the clear terminals of SN7474 flipflops 612–626 which store the parameters input by operation of the parameter select switch 60. The outputs FDFRN-FDMAN from the flipflops 612–626 are applied to terminals of LEDS L1-L8 which comprise the Active Mode LEDS 64 previously shown in FIG. 2. As previously noted, LEDS 64 are illuminated in response to setting of parameters by operation of the circular switch 60.

Signals SCARRYBT-FDFRBT are applied from the buffer storage matrix shown in FIG. 6 to NAND gates 630–646, the outputs of which are connected to LEDS L11-L19 which comprise the Buffer Store LEDS 62 previously shown in FIG. 2. Signal PU2 is applied to LED L21 which comprises the active breakpoint LED 52, while the signal PU3 is applied to LED L20 which comprises the active snapshot LED 50 shown in FIG. 2.

The signals DEQUAL-DBRKPT are applied to an input of an AND gate 650, the output of which is applied to a flipflop 652. Signals DRLSN and DBRKPT are applied to inputs of an AND gate 654 which is applied to the clear terminal of flipflop 652. The Q output of flipflop 652 is applied to LED L10 to indicate operation in the breakpoint mode. Signals DEQUAL and DSNPSHT are applied to inputs of an AND gate 656 connected to a flipflop 658 which controls the operation of LED L9 to indicate operation in the snapshot mode.

Figure 18:
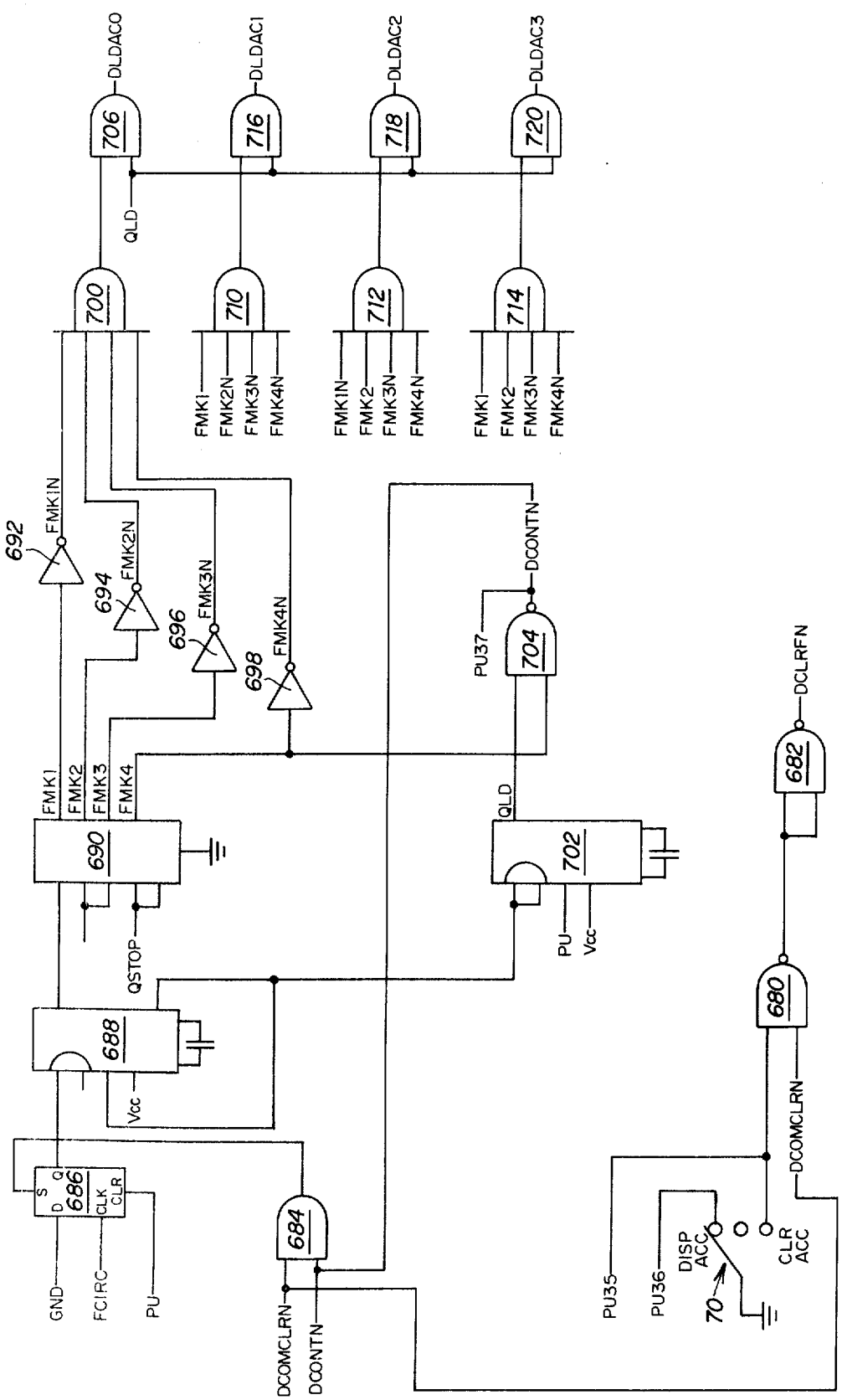
FIG. 18 is a schematic diagram of logic circuitry associated with the display and clear accumulator toggle switch and associated circuitry.

Referring to FIG. 18, toggle switch 70, previously shown in FIG. 2, is operable between the display accumulator and clear accumulator terminals. Positioning of the toggle switch 70 in the display accumulator position generates the PU36 signal. Operation of the toggle 70 to the clear accumulator terminal generates the PU35 signal and applies the signal to an input of a NAND gate 680. The output of gate 680 is applied to the inputs of a NAND gate 682 which generates the DCLRFN signal which is applied to clear the registers shown in FIG. 19. The DCOMCLRN signal is applied to gate 680 and is also applied to an AND gate 684. The DCONTN signal is applied to gate 684 which is connected to a terminal of a D-flop 686. The Q terminal of D-flop 686 is connected to a one shot 688 which is connected to a four bit binary counter 690, which may comprise for example a SN7493 counter. The four outputs of counter 690 are applied through invertors 692–698 to a four input NAND gate 700. One shot 688 is connected to a second one shot 702 which is connected to an input of the NAND gate 704 to generate the PU37 and DCONTN signals.

The output of gate 700 is applied to an input of an AND gate 706 to generate the DLDAC0 signal. Signals FMK1-FMK4N are respectively applied to inputs of AND gates 710–714, the outputs of which are connected to AND gates 716–720. The signal QLD is also applied to inputs of gate 706 and 716–720. The outputs of gate 716–720 comprise the signals DLDAC1-DLDAC3.

The circuitry shown in FIG. 18 operates to pick the "pocket" in which to stop and start the computer 10 to store the accumulator register contents during operation in the snapshot mode. When the snapshot mode of operation is selected on the front console, the D-flop 686 is set and the one shot 688 is triggered. Upon triggering of the one shot 688, the counter 690 begins counting. The count from counter 690 is decoded in order to generate the DLDAC0 signal. This signal picks the "pocket" or point of time in which the contents of the first accumulator (accumulator 0) of the computer is loaded. On generation of signals DLDAC1-DLDAC3, the next three subsequent digital computer accumulators are loaded by the system. Upon the generation of signal DCONTN, the signal is sent to the computer in order to restart the computer. In the preferred embodiment, the entire sequence provided by the circuitry shown in FIG. 18 for stopping the computer, loading the contents of the computer accumulator register and restarting the computer is accomplished within 400 nanoseconds, and thus the computer continues operation uninterruptedly as if the contents of the computer registers have not been detected.

Figure 19:
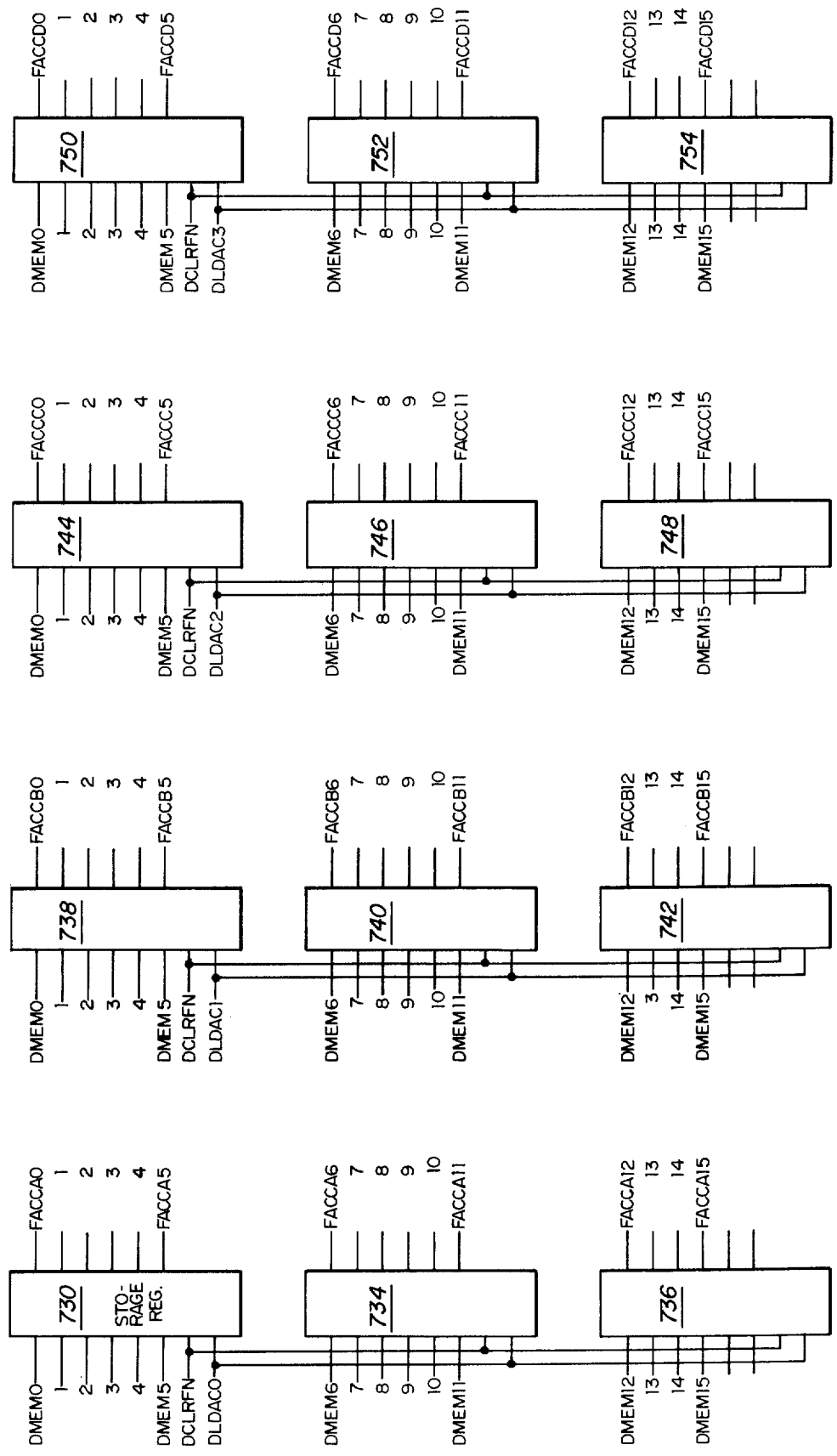
FIG. 19 is a circuit diagram of accumulator storage registers of the invention.

FIG. 19 illustrates the storage registers in which the contents of the computer accumulators are stored. For each one of the four computer accumulators, three storage registers are provided. For example, for the first accumulator, registers 730–736 are provided. For the second accumulator, registers 738–742 are provided for storage. For the third and fourth accumulators, registers 744–754 are provided. The registers 730–754 may comprise for example SN74174 storage registers. The inputs to the storage registers 730–754 comprise the DMEM0-DMEM15 signals derived from the cable connections shown in FIG. 3. In addition, the DLRFN signal is applied from gate 682 shown in FIG. 18 in order to provide clearing function upon toggling of the toggle switch 70. The loading signals DLDAC0-DLDAC3 are applied to the registers from the circuitry shown in FIG. 18.

Figure 20:
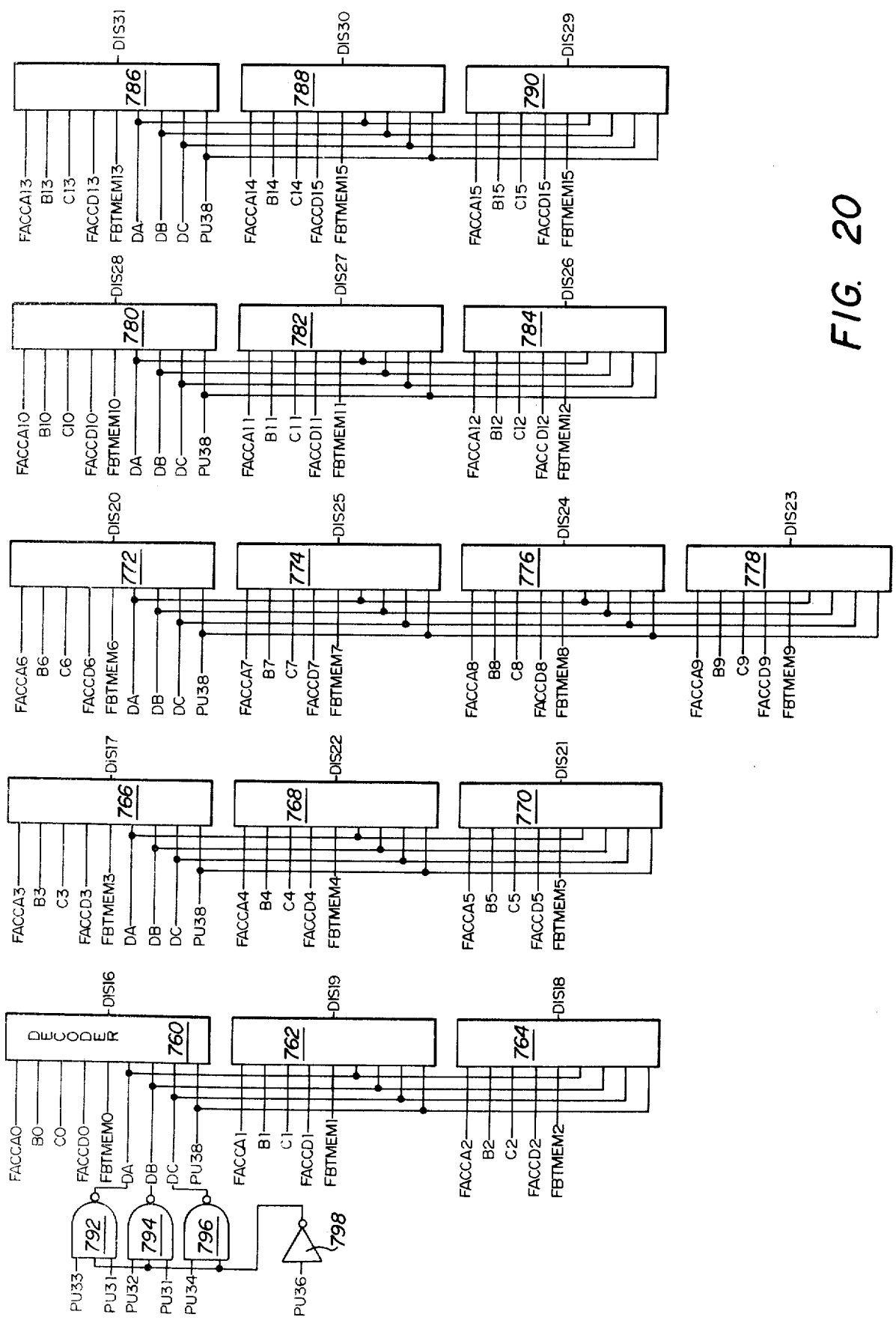
FIG. 20 is a schematic diagram of the decoding circuitry of the invention to determine the display states of the light emitting diodes of the display.

FIG. 20 illustrates circuitry for receiving outputs from the accumulator storage register shown in FIG. 19 in order to enable display of the accumulator register on the console shown in FIG. 2. Signals FACCA0-FACCA15 derived from the storage registers of FIG. 19 are applied to inputs of one of eight decoders 760–790 in the manner illustrated. In addition, signals PU31-PU34, provided from the accumulator select switch shown in FIG. 9, are provided through NAND gates 792–796 to inputs of the decoders 760–790 in the manner illustrated. Further, signal PU36 is applied through an invertor 798 to inputs of gates 792–796. This signal PU36 is provided by operation of the toggle switch 70 in the manner shown in FIG. 18. The circuitry shown in FIG. 20 thus decodes the position of the accumulator select switch 60 in order to selectively display the contents of the accumulator registers shown in FIG. 19. The outputs of the decoders 760–790 comprise signals D1S16-D1S31 which are applied to the data LEDS 40 shown in FIG. 2 in order to display the desired accumulator register data.

Figure 21:
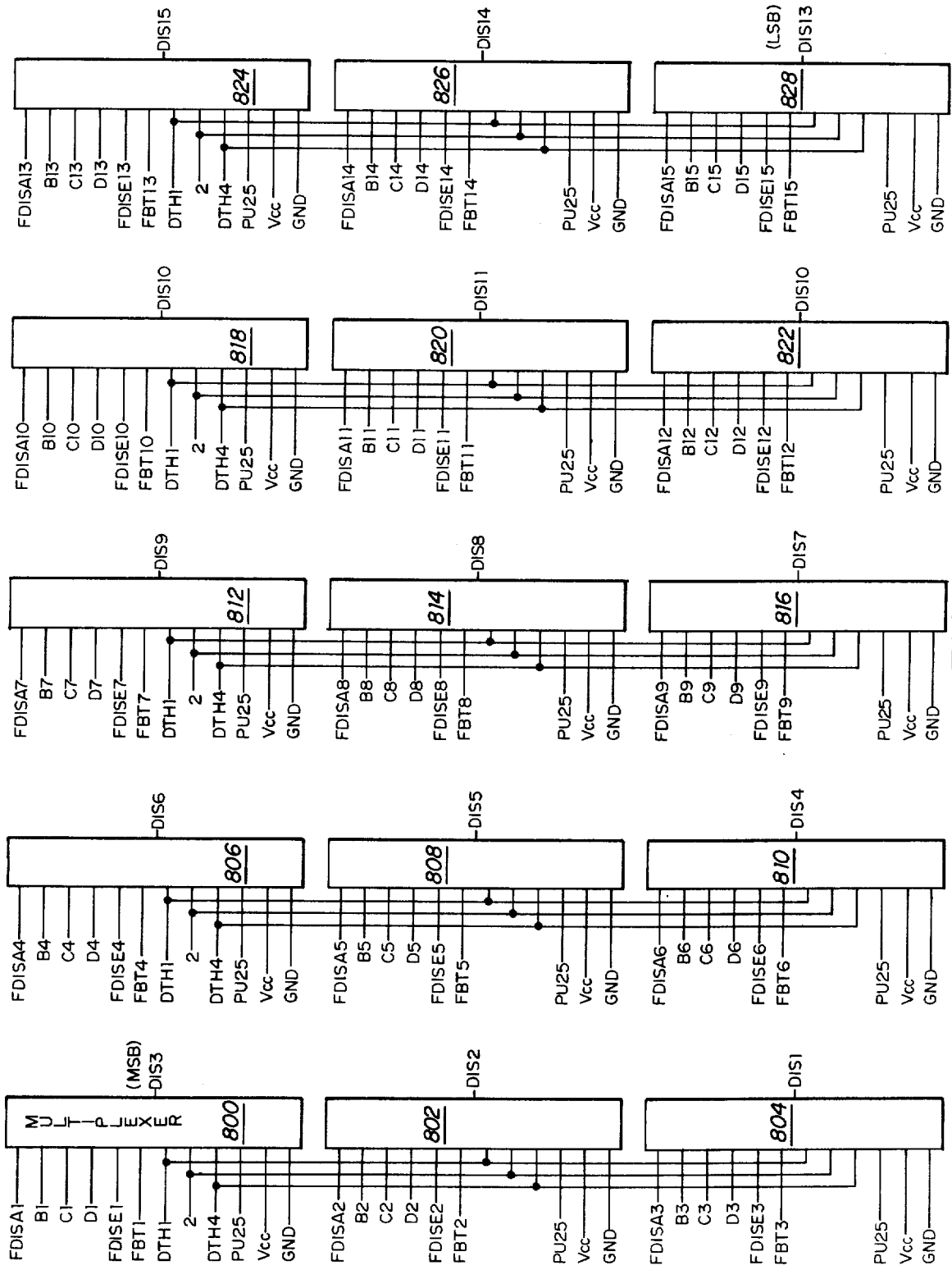
FIG. 21 is a schematic diagram of multiplexing circuitry to enable time sharing of the light emitting diode display.

FIG. 21 illustrates multiplexing circuitry which enables time sharing of the LED display 38 and 40 on the console shown in FIG. 2. Therefore, signals from the breakpoint registers, the address and/or data buffers, and the accumulator registers are applied to eight-to-one multiplexers 800–828. The multiplexers 800–828 then generate display control signals DIS1-DIS15 which are applied to control the LEDS 38–40 shown in FIG. 2. The multiplexers 800–828 may comprise for example SN4151 multiplexers. The signals DIS1-DIS3 constitute the most significant bit display, while the signals DIS13-DIS15 constitute the least significant bits displayed. It will be seen in FIG. 21 that five columns of three bits each are displayed in order to enable the time sharing of the LEDS as selected by operation of the various toggle switches on the console.

FIG. 22 illustrates decoding circuitries for receiving display control signals from the circuits shown in FIGS. 20 and 21 and for applying the signals to selected display LEDS 38 and 40. Specifically, the display control signals DIS1-DI31 generated from the circuits previously described in FIGS. 20 and 21 are applied to inputs of seven segment BCD decoders 840–862 in the manner illustrated. The decoders may comprise, for example, SN7447 BCD decoders. In addition, the signals DTEST and DBLNK are applied in order to apply testing of the system and to enable blanking of the displays when the system is not in use. The signal PU26 is also applied from the off-on switch of the system. The output L1-L76 from the decoders 840–862 are applied to the LEDS of the displays 38, 40 and 42 in the manner to be described in FIG. 26.

FIG. 23 illustrates circuitry for generating the blank signals to prevent display operation. Signals DRUNN-SCIRCN are applied to inputs of NAND gates 864–868 in order to generate the blank signals DBLNKA-DBLNKC.

Figure 24:
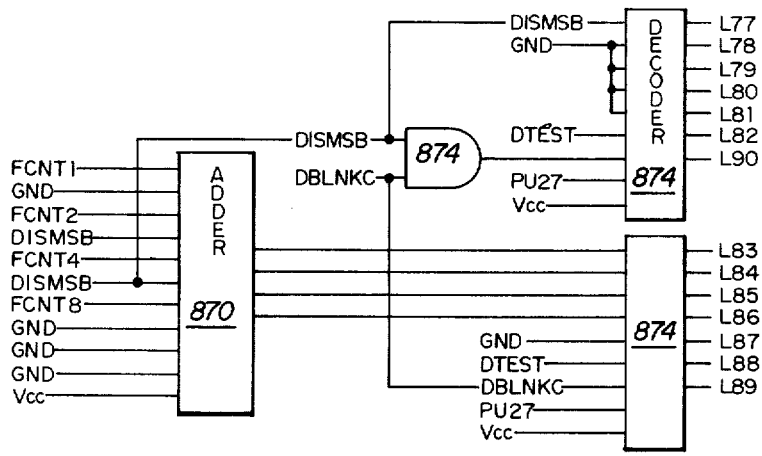
FIG. 24 is a schematic diagram of logic for incrementing or decrementing the LED display.

FIG. 24 illustrates circuitry for incrementing and decrementing the pointer LEDS 42 shown in FIG. 2. Signals SCNT1-SCNT8 are applied to inputs of a four bit adder 870 which is operated as a subtractor in order to provide a decimal output. The adder may comprise for example an SN7483 adder. The output of the adder 870 is applied to inputs of a decoder 872. Signals DISMSB and DBLNKC are applied to an AND gate 874 which is applied to a second decoder 874. In addition, signals including DTEST and signal PU27 are applied to the decoders 872 and 874. The outputs of the decoders 872–874 comprise signals L77-L89 which are utilized to control the operation of the pointer LED display 42 during incrementing and decrementing of the data stored in the memory 16.

FIG. 25 illustrates circuitry for enabling the display of the most significant bit of a binary number. Signals FCNT4N and FCN22 are applied to inputs of a NAND gate 880, the output of which is applied through a NAND gate 882 to a NAND gate 884. Signal SCNTB is applied to an input of gate 882, while signal FCNT16N is applied to an input of gate 884. The output of gate 884 comprises DISMSB which is applied to the adder 870 and decoder 874 shown in FIG. 24.

Figure 26:
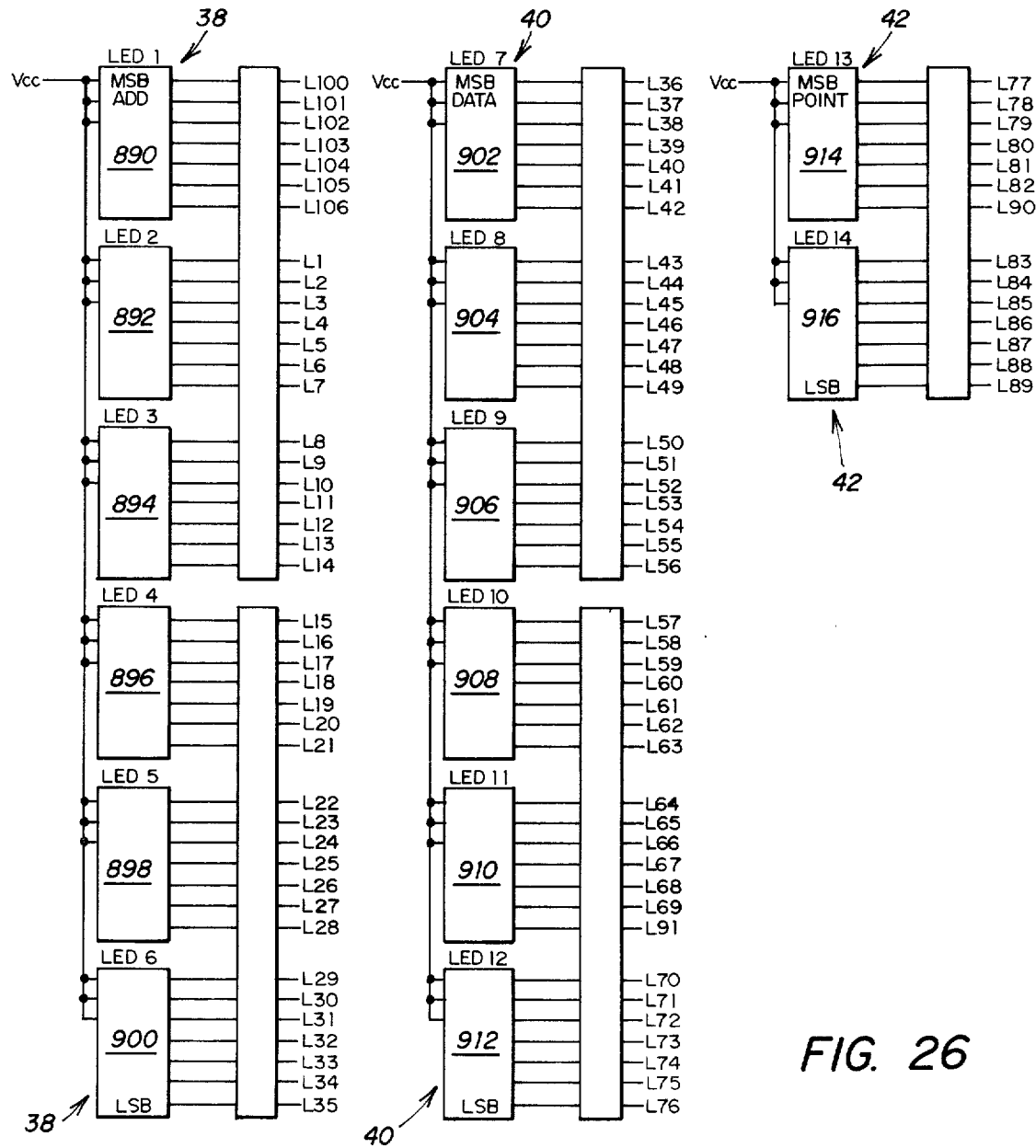
FIG. 26 is a schematic diagram of light emitting diodes making up a portion of the display on the front console of the system.

FIG. 26 illustrates in schematic detail the LEDS comprising the address display 38, the data display 40 and the pointer display 42 previously shown in FIG. 2. The address display 38 comprises six LEDS 890–900. LEDS 890–900 may comprise any suitable type of LED or other display device which is operable in response to control signals for generating any one of ten numerical digits. The control signals L1-L35 generated from decoders 840–848 and signals L100-L106 generated from decoder 859 are applied to the LEDS 890–900 in order to control the illumination thereof. Similarly, signals L36-L76 generated from decoders 852–862 are applied to the LEDS 902–912 in order to display the selected data signals on the display 40. Control signals L77-L89 generated from the decoders 872 and 874 previously shown in FIG. 24 are applied to control the pointer LEDS 914–916 in order to indicate which of the sixteen stages of the memory is presently being displayed.

Figure 27:
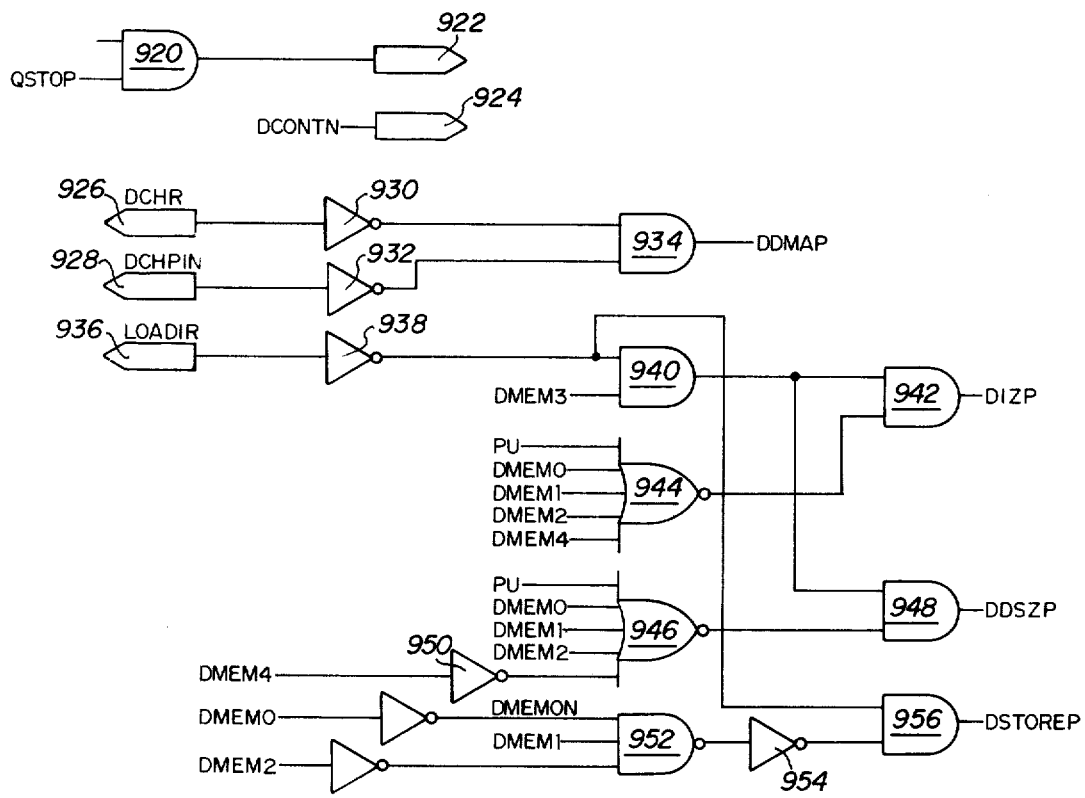
FIG. 27 is a schematic diagram of logic circuitry interconnecting to the back plane of the computer.

Referring to FIG. 27, circuitry is shown for interconnection to the back plane of the computer 10. The QSTOP signal previously generated by the flipflop 404 in FIG. 14 is applied to an input of a NAND gate 920, the output of which is connected to a terminal 922 attached to the back plane of the computer. As previously noted, the generation of the QSTOP signal stops operation of the computer after detection of the selected breakpoint signal. In addition, the DCONTN signal, previously described, is applied to pin 924 connected to the back plane of the computer 10. Signals DCHR and DCHPIN are applied to terminals 926 and 928 from the back plane of the computer 10 and are applied through invertors 930 and 932, respectively, to inputs of an AND gate 934 in order to generate the DDMAP signal.

The signal LOADIR is applied through terminal 936 from the back plane of computer 10 through an invertor 938 to an input of an AND gate 940. Signal DMEM3, previously applied from the back plane of the computer through the cable shown in FIG. 3, is applied to the second input of gate 940. The output of gate 940 is applied to an AND gate 942 which generates the DIZP signal previously described. Signals PU-DMEM4 are applied from the back plane of the computer 10 through the cabling shown in FIG. 3 and are applied to inputs of multi-input NOR gates 944 and 946. The output of gate 944 is applied to an input of gate 942, while the output of gate 946 is applied to an input of an AND gate 948 to generate the signal DDSZP. Signal DMEM4 is applied through an invertor 950 to an input of gate 946. Signals DMEM0 and DMEM2 are applied through invertors to an input of a NAND gate 952. The output of gate 952 is applied through an invertor 954 to an input of an AND gate 956 in order to generate the DSTOREP signal.

Figure 28:
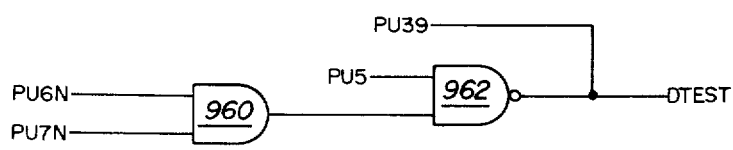
FIG. 28 is a schematic diagram of logic circuitry for providing testing of the LED display.

FIG. 28 illustrates circuitry for performing the test function operation of the system. Signals PU6N and PU7N, generated from operation of the thumb wheel switch 36 as shown in FIG. 7, are applied to inputs of an AND gate 960, the output of which is applied to a NAND gate 962. Signal PU5 generated from the thumb wheel switch 36 is also applied to an input of gate 962. The output of gate 962 comprises the DTEST signal which operates to illuminate all of the LEDS on the console shown in FIG. 2 with the number eight to insure that all the LEDS are working.

Figure 29:
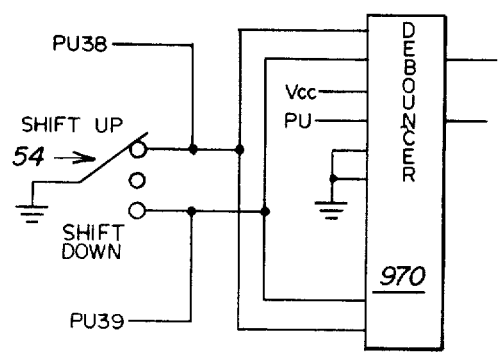
FIG. 29 is a schematic diagram of a shift up and shift down toggle switch including a switch debouncing circuit.

FIG. 29 illustrates the shift up and shift down toggle switch 54 previously shown in FIG. 2. Operation of the switch 54 to the shift up position generates the signal PU38 which is applied to register 760 in FIG. 20. Operation of the switch 54 to the shift down position generates the PU39 signal. Both of the signals PU38-PU39 are applied to a switch debouncer 970, which may comprise for example a DM7544 debouncer. The output of the debouncer 970 is applied to the circuitry shown in FIG. 16 to provide the shift up and shift down signal.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for assisting in the detection of errors and malfunctions in the operation of a programmed digital computer comprising:
   memory means connected to the computer for temporarily storing representations of each of the program instructions executed by the computer during operation thereof, and
   means responsive to a predetermined state of operations of the computer for controlling said memory means to permanently store a predetermined number of the last program instructions executed by the computer prior to the occurrence of the state of operation.

2. The system of claim 1 wherein said predetermined state comprises a malfunction of the computer.

3. The system of claim 1 wherein said predetermined state comprises the occurrence of a particular instruction during operation of the computer.

4. The system of claim 1 and further including means responsive to said predetermined state for stopping operation of the computer.

5. The system of claim 1 and further comprising:
   means for selectively displaying any one of said predetermined number of permanently stored program instructions.

6. The system of claim 1 wherein said memory means comprises a multi stage buffer storage matrix for temporarily storing each of the program instructions for a preset time interval.

7. A system for assisting in the detection of errors and malfunctions in the operation of a programmed digital computer comprising:
   means for exterior connection to the computer to receive representations of the program instructions executed by the computer,
   a memory having a plurality of memory cells for sequentially storing a plurality of the representations of the program instructions,
   circuitry responsive to a predetermined state of operation of the computer for controlling said memory such that a plurality of the last program instructions prior to the occurrence of the predetermined state are stored in said memory cells, and
   display means operable to selectively display representations of the program instructions stored in said memory cells.

8. The system of claim 7 wherein said connection means connects with the back plane of the computer.

9. The system of claim 7 wherein said memory comprises a buffer storage matrix.

10. The system of claim 9 wherein said matrix is normally connected as a series first in-first out memory.

11. The system of claim 10 and further comprising:
    means responsive to said predetermined state of operation for connecting the output of said memory with the input of said memory in a circulating circuit such that a plurality of program instructions are stored within said memory.

12. The system of claim 11 and further comprising:
    means for circulating the stored program instructions around said circulating circuit such that selected ones of the instructions may be viewed on said display means.

13. The system of claim 7 wherein said predetermined state of operation comprises:
    a malfunction of the computer.

14. The system of claim 7 wherein said predetermined state of operation comprises:
    the execution of a predetermined instruction address.

15. The system of claim 7 wherein said predetermined state of operation comprises:
    the execution of a predetermined function at a predetermined address.

16. The system of claim 7 wherein said predetermined state of operation comprises:
    the execution of a predetermined function within a predetermined range of addresses.

17. The system of claim 7 and further comprising:
    breakpoint means for automatically stopping operation of the computer upon the occurrence of the predetermined state of operation.

18. The system of claim 7 wherein the digital computer includes accumulator registers and further comprising:
    means for storing the contents of specified ones of the accumulator registers of the computer upon the occurrence of the predetermined state of operation.

19. A system for monitoring the operation of a digital computer comprising:
    means for connection to the back plane of the computer for receiving representations of the program instructions executed by the computer,
    a memory having a plurality of series connected stages normally connected in a first in-first out configuration to receive said representations, each of said representations being sequentially stored in successive ones of said stages and then transferred to the output of said memory,
    sentinel circuitry operable to connect the memory output to the input of said memory to store the contents of said memory upon the occurrence of a malfunction of the computer,
    breakpoint circuitry operable to terminate operation of the computer and to connect the output to the input of said memory to store the contents of said memory upon the execution of preselected program instructions, snapshot circuitry operable to connect the output to the input of said memory to store the contents of said memory upon the execution of preselected program instructions, means for selecting one of said sentinel breakpoint and snapshot circuitries and for applying selected parameters to said breakpoint and snapshot circuitry, and means for selectively displaying the stored contents of said memory.

20. The system of claim 19 wherein said memory comprises a buffer storage matrix including a plurality of interconnected registers.

21. The system of claim 19 and further comprising:
means for circulating the stored contents of said memory such that the contents of each stage of said memory may be reviewed on said display means.

22. The system of claim 19 and further comprising:
means for setting a plurality of different addresses into said breakpoint circuitry in order to define said preselected program instructions.

23. The system of claim 19 and further comprising:
means for setting a range of addresses into said breakpoint circuitry in order to define said preselected program instructions.

24. The system of claim 19 and further comprising:
means for setting in a computer operation mode into said breakpoint circuitry in order to define said preselected program instructions.

25. The system of claim 19 wherein said display means comprises:
means for displaying the data and address stored in each stage of said memory.

26. The system of claim 25 and further comprising:
pointer means for displaying which of the stages of said memory is being displayed.

27. The system of claim 19 wherein said memory is converted from a first in-first out memory to a first in-last out memory upon the execution of preselected program instructions or upon the occurrence of a malfunction of the computer.

28. A sentinel system for monitoring the operation of a digital computer comprising:
means for connection to the back plane of the computer for receiving representations of the program instructions and addresses executed by the computer, a multi-stage buffer storage matrix connected to sequentially store said representations in successive ones of said stages, means responsive to termination of operation of the computer for connecting the output of said memory to the input of said memory in a circulating memory configuration, display means having address and data displays for selectively displaying the contents of any selected stage of said memory, and pointer display means for indicating which stage of said memory is currently being displayed on said display means.

29. The system of claim 28 wherein said display means comprises light emitting diodes.

30. A breakpoint system for monitoring the operation of a digital computer comprising:

means for attachment to the back plane of the computer for receiving representations of the program instructions executed by the computer, a memory having a plurality of series connected stages for receiving said representations, said representations being sequentially stored in successive ones of said stages, means for inputting predetermined breakpoint addresses and parameters, means for stopping operation of the computer upon execution of an instruction by the computer having one of said breakpoint addresses and parameters, means for permanently storing a preset number of the representations of the last instructions executed by the computer prior to the termination of operation of the computer, and means for displaying each of the premanently stored representations in the memory.

31. The system of claim 30 wherein said inputting means comprises a plurality of registers for receiving a plurality of breakpoint addresses.

32. The system of claim 31 and further comprising:
thumbwheel switches for inputting data into said registers.

33. The system of claim 30 wherein said inputting means comprises registers for receiving a range of breakpoint addresses.

34. The system of claim 30 wherein said inputting means comprises a switch for inputting a plurality of computer operation parameters.

35. The system of claim 34 wherein one of said operations comprises:
an execute operation.

36. The system of claim 34 wherein one of said operations comprises:
a fetch operation.

37. The system of claim 34 wherein one of said operations comprises:
a store operation.

38. The system of claim 34 wherein one of said operations comprises:
a data channel operation.

39. The system of claim 34 wherein one of said operations comprises:
a defer operation.

40. The system of claim 34 wherein one of said operations comprises:
an increment memory automatically operation.

41. The system of claim 30 wherein said means for displaying comprises:
an instruction address display and an instruction data display.

42. The system of claim 30 and further comprising:
a mode active display for displaying said breakpoint parameters input by said means for inputting.

43. The system of claim 30 and further comprising:
a buffer store display for displaying which breakpoint parameter the computer was in when the computer terminated operation.

44. The system of claim 30 wherein said memory is converted into a first in-last out memory upon the termination of operation of the computer.

45. The system of claim 30 and further comprising:
means for time sharing said display means for displaying the contents of said memory and for displaying said breakpoint addresses input by said inputting means.

46. A snapshot system for monitoring the operation of a digital computer comprising:
  means for attachment to the back plane of the computer for receiving representations of the program instructions executed by the computer,
  a multi-stage memory for receiving said representations and for sequentially storing said representations in successive ones of said stages,
  means for inputting and storing a snapshot address and parameter,
  means operable in response to said inputting and storing means for operating said memory to permanently store a prescribed number of the last instruction representations prior to the execution of said snapshot address and parameter.

47. The system of claim 46 wherein the digital computer includes accumulator registers and further comprising circuitry for storing the contents of ones of the computer accumulator registers.

48. The system of claim 47 wherein said circuitry comprises:
  means for stopping the computer after the execution of the snapshot address,
  means for accessing the selected accumulator registers, and
  means for restarting operation of the computer prior to execution by the computer of the next program instruction.

49. A method of monitoring the operation of a digital computer comprising:
  temporarily storing representations of the program instructions executed by the computer during operation thereof, and
  permanently storing a predetermined number of the last program instructions executed by the computer prior to the occurrence of a specified state of operation of the computer.

50. The method of claim 49 and further comprising:
  temporarily storing the representations in a first in-first out manner, and
  permanently storing the predetermined number of representations in a first in-last out manner.

51. A method of monitoring the operation of a programmed digital computer comprising:
  temporarily storing a representation of each program instruction executed by the computer,
  monitoring the operation of the computer for the occurrence of a predetermined operational state,
  permanently storing a predetermined number of the last program instructions executed prior to the occurrence of the predetermined operational state, and
  selectively displaying said permanently stored program instructions.

52. The method of claim 51 wherein the predetermined operational state comprises the execution of a predetermined program instruction.

53. The method of claim 51 wherein the predetermined operational state comprises:
  the malfunction of the computer.

54. The method of claim 51 wherein the predetermined operational state comprises:
  the execution of an instruction at a prescribed address.

55. The method of claim 51 wherein the predetermined operational state comprises:
  the execution of an instruction at a prescribed range of addresses.

56. The method of claim 51 wherein the predetermined operational state comprises:
  the execution of an instruction at a prescribed address during a prescribed computer operational mode.

57. The method of claim 51 wherein the digital computer includes accumulator registers and further comprising:
  storing the contents of selected ones of the accumulator registers of the computer upon the occurrence of the predetermined operational state without interfering with the continued operation of the computer.

* * * * *

UNITED STATES PATENT OFFICE
CERTIFICATE OF CORRECTION

Patent No. 3,937,938     Dated February 10, 1976

Inventor(s) Gordon H. Matthews

It is certified that error appears in the above-identified patent and that said Letters Patent are hereby corrected as shown below:

Col. 4, line 60, "inlast" should be --in - last--.
Col. 9, line 13, "accumulatr" should be --accumulator--;
      line 34, "MD15" should be --MB15--;
      line 42, "IONP-DEMEM12" should be --DIONP-DMEM12-- and "DEMEM13" should be --DMEM13--.
Col. 10, line 20, "Q" should be --$\bar{Q}$--;
       line 26, "Q" should be --$\bar{Q}$--.
Col. 12, line 3, "signa" should be --signal--;
       line 47, "gatd" should be --gate--;
       line 57, "PU31-Pu34" should be --PU31-PU34--;
       line 60, "Pull", second occurrence, should be --PU11--.
Col. 15, line 59, "Q" should be --Q--.

Signed and Sealed this twenty-fifth Day of May 1976

[SEAL]

Attest:

RUTH C. MASON
Attesting Officer

C. MARSHALL DANN
Commissioner of Patents and Trademarks